(12) United States Patent
Zhao et al.

(10) Patent No.: US 11,706,454 B2
(45) Date of Patent: Jul. 18, 2023

(54) ONE-LEVEL TRANSFORM SPLIT

(71) Applicant: TENCENT AMERICA LLC, Palo Alto, CA (US)

(72) Inventors: Xin Zhao, San Diego, CA (US); Liang Zhao, Sunnyvale, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/378,114

(22) Filed: Jul. 16, 2021

(65) Prior Publication Data

US 2021/0352327 A1 Nov. 11, 2021

Related U.S. Application Data

(63) Continuation of application No. 16/694,338, filed on Nov. 25, 2019.

(60) Provisional application No. 62/785,681, filed on Dec. 27, 2018, provisional application No. 62/776,354, filed on Dec. 6, 2018.

(51) Int. Cl.
*H04N 11/02* (2006.01)
*H04N 19/64* (2014.01)
*H04N 19/132* (2014.01)
*H04N 19/176* (2014.01)
*H04N 19/159* (2014.01)
*H04N 19/137* (2014.01)

(52) U.S. Cl.
CPC ........ *H04N 19/647* (2014.11); *H04N 19/132* (2014.11); *H04N 19/137* (2014.11); *H04N 19/159* (2014.11); *H04N 19/176* (2014.11)

(58) Field of Classification Search
CPC .................................................. H04N 19/647
USPC ...................................... 375/240.01–240.29
See application file for complete search history.

(56) References Cited

U.S. PATENT DOCUMENTS

| | | |
|---|---|---|
| 5,394,190 A | 2/1995 | Yamada |
| 9,451,264 B2 | 9/2016 | Oh et al. |
| 9,584,828 B2 | 2/2017 | Oh et al. |
| 9,979,986 B2 | 5/2018 | Min et al. |
| 2006/0165171 A1 | 7/2006 | Cha et al. |
| 2008/0310504 A1 | 12/2008 | Ye et al. |

(Continued)

FOREIGN PATENT DOCUMENTS

| | | |
|---|---|---|
| KR | 10-2017-0132036 A | 12/2017 |
| WO | 2017/157249 A1 | 9/2017 |

OTHER PUBLICATIONS

International Search Report dated Mar. 5, 2020, issued by the International Searching Authority in application No. PCT/US2019/064402.

(Continued)

*Primary Examiner* — Leron Beck
(74) *Attorney, Agent, or Firm* — Sughrue Mion, PLLC

(57) ABSTRACT

A method of partitioning a coding unit (CU) into one or more transform units (TUs) for encoding a video sequence using at least one processor includes determining a height of the CU; determining a width of the CU; determining a TU size of each of the one or more TUs based on the height of the CU and the width of the CU; determining one or more TU positions of the one or more TUs based on the height of the CU and the width of the CU; and partitioning the CU into (Continued)

the one or more TUs based on the determined size of the one or more TUs and the one or more positions of the one or more TUs.

20 Claims, 15 Drawing Sheets

(56) References Cited

U.S. PATENT DOCUMENTS

| | | |
|---|---|---|
| 2009/0225847 A1 | 9/2009 | Min et al. |
| 2011/0206125 A1 | 8/2011 | Chien et al. |
| 2012/0003858 A1 | 1/2012 | Gabrielsson |
| 2012/0163455 A1 | 6/2012 | Zheng et al. |
| 2013/0136184 A1 | 5/2013 | Suzuki et al. |
| 2013/0272379 A1 | 10/2013 | Sole Rojals et al. |
| 2014/0086307 A1 | 3/2014 | Karczewicz et al. |
| 2015/0103908 A1 | 4/2015 | Zhou |
| 2016/0219290 A1 | 7/2016 | Zhao et al. |
| 2016/0295240 A1 | 10/2016 | Kim et al. |
| 2018/0131962 A1 | 5/2018 | Chen et al. |
| 2018/0249156 A1 | 8/2018 | Heo et al. |
| 2019/0289301 A1 | 9/2019 | Lim et al. |

OTHER PUBLICATIONS

Written Opinion dated Mar. 5, 2020, issued by the International Searching Authority in application No. PCT/US2019/064402.

Office Action dated May 30, 2022 in Japanese Application No. 2021-525812.

"H.265/HEVC", Oct. 21, 2013, ISBN: 978-4-8443-3468-2, pp. 108-114 (14 pages total).

Extended European Search Report dated Aug. 24, 2022 in European Application No. 19892598.4.

Krit Panusopone et al., "Implicit Transform Unit Partitioning in HEVC", Picture Coding Symposium (PCS), IEEE, 2013, pp. 213-216 (4 pages total).

Korean Office Action issued in Korean Application No.. 10-2021-7012851 dated Mar. 9, 2023.

Chen, Jianle et al., Algorithm description for Versatile Video Coding and Test Model 3 (VTM 3), Joint Video Experts (JVET) of ITU-T SG 16 WP 3 and ISO/IEC JTC 1/SC 29/WG 11, Document: JVET-L1002-v1, 12th Meeting: Macao, CN, 3-12, pp. 1-37, dated Oct. 2018.

Zhao, Yin et al., CE6: Sub-block transform for inter clocks (CE6.1.2), Joint Video Experts Team (JVET) of ITU-T SG 16 WP 3 and ISO/IEC JTC 1/SC 29/WG 11, Document: JVET-L0358-v1, 12th Meeting: Macao, CN, 3-12, pp. 1-3, dated Oct. 2018.

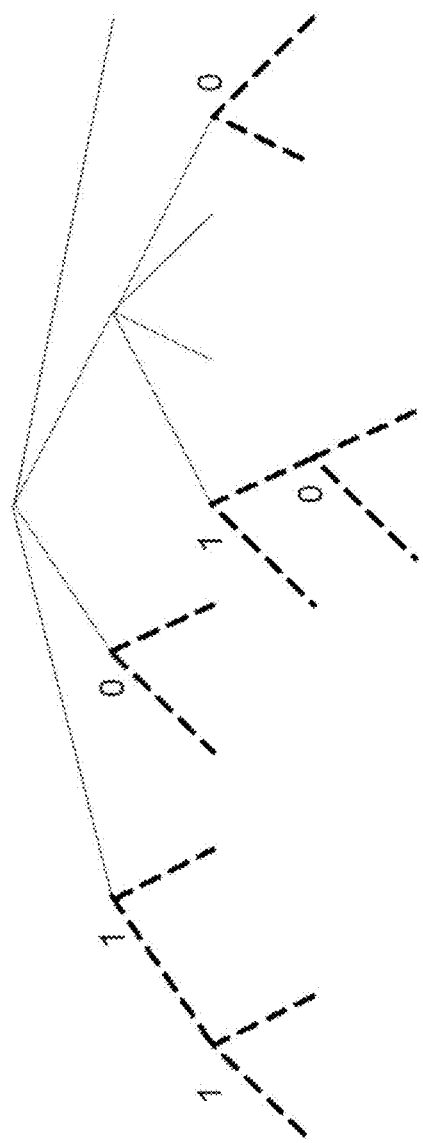
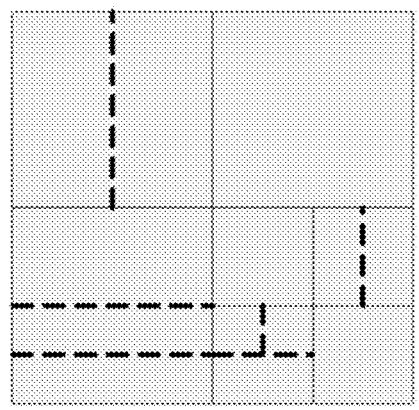
FIG. 1

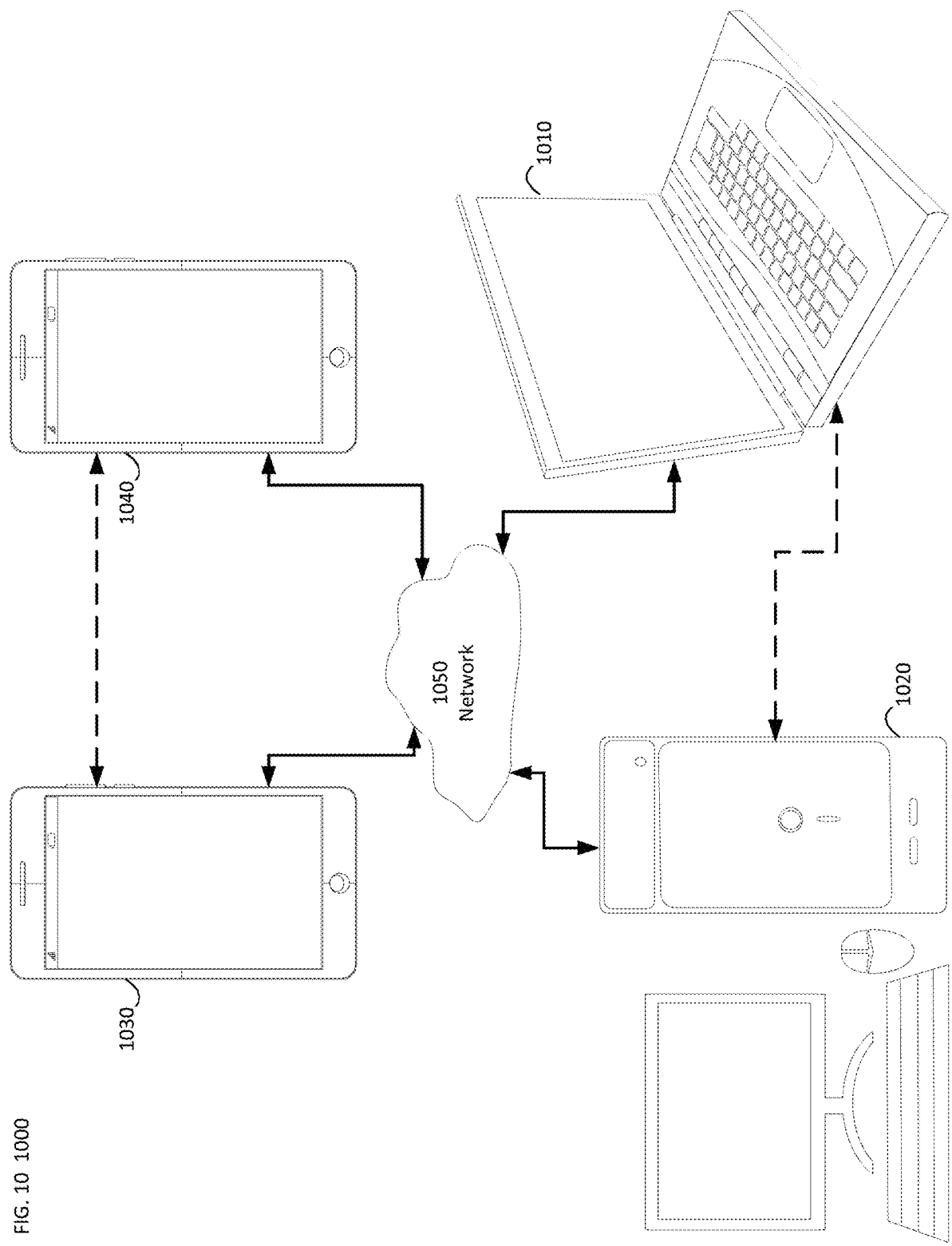

FIG. 13    Encoder 1103

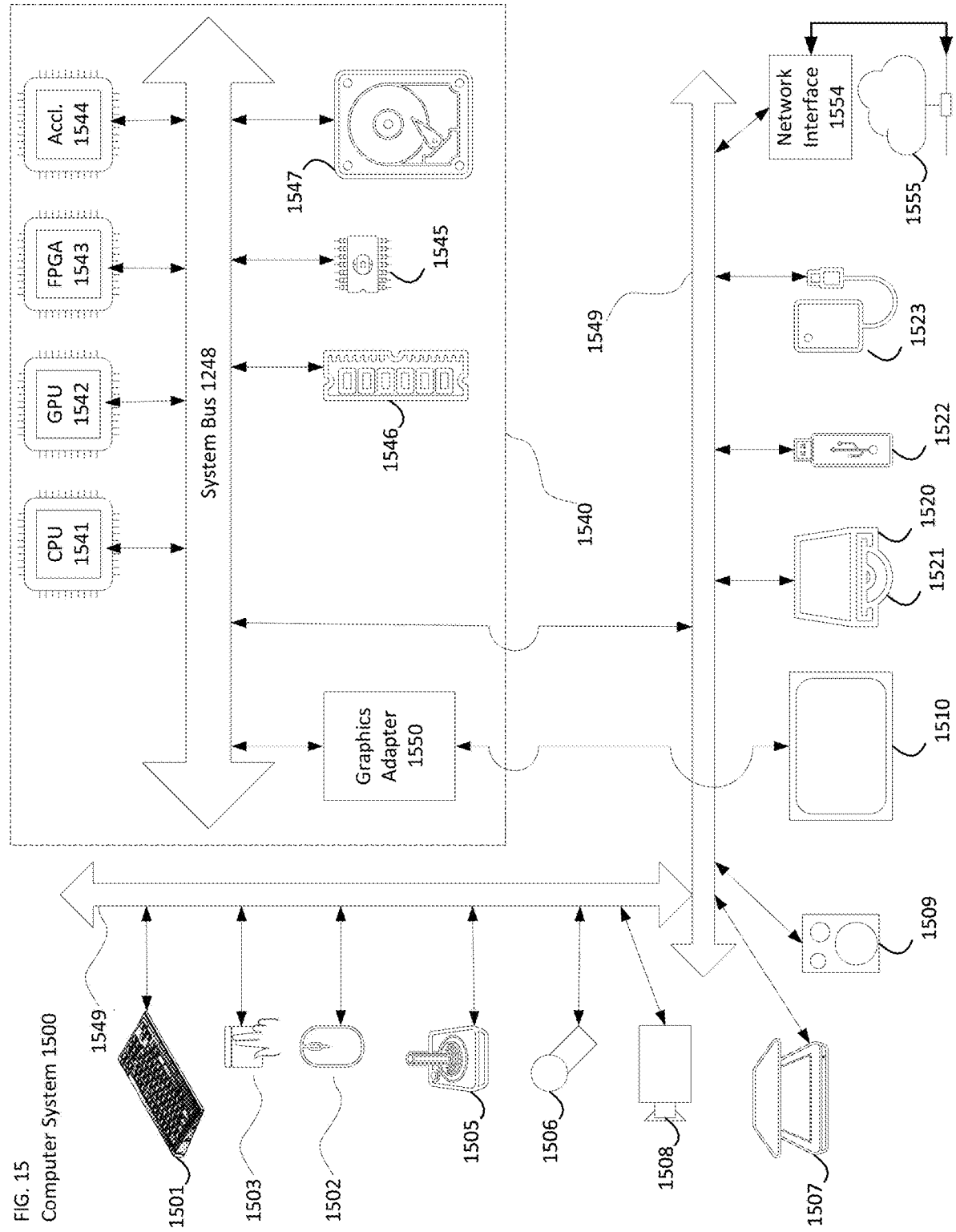

ONE-LEVEL TRANSFORM SPLIT

CROSS-REFERENCE TO RELATED APPLICATION

This application is a continuation of U.S. application Ser. No. 16/694,338, filed on Nov. 25, 2019, in the United States Patent and Trademark Office, which claims priority from U.S. Provisional Application No. 62/776,354, filed on Dec. 6, 2018, and U.S. Provisional Application No. 62/785,681, filed on Dec. 27, 2018, in the United States Patent and Trademark Office, the disclosures of which are incorporated herein by reference in their entireties.

FIELD

The present disclosure relates to next-generation video coding technologies beyond HEVC (High Efficiency Video Coding), e.g., Versatile Video Coding (VVC). More specifically, a transform scheme for applying multiple transforms within one coding unit, i.e., transform split, and an adaptive sub-block transform which uses the prediction block information to determine the transform size are disclosed.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology with a compression capability that significantly exceeds that of the HEVC standard (including its extensions). In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. With careful evaluation, JVET formally launched the standardization of next-generation video coding beyond HEVC, i.e., the so-called Versatile Video Coding (VVC). The current version of VTM (VVC Test Model), i.e., VTM 3.

SUMMARY

According to an embodiment, a method of partitioning a coding unit (CU) into one or more transform units (TUs) for encoding a video sequence using at least one processor includes determining a height of the CU; determining a width of the CU; determining a TU size of each of the one or more TUs based on the height of the CU and the width of the CU; determining one or more TU positions of the one or more TUs based on the height of the CU and the width of the CU; and partitioning the CU into the one or more TUs based on the determined size of the one or more TUs and the one or more positions of the one or more TUs.

According to an embodiment, a device for partitioning a coding unit (CU) into one or more transform units (TUs) for encoding a video sequence includes at least one memory configured to store program code; and at least one processor configured to read the program code and operate as instructed by the program code, the program code including: first determining code configured to cause the at least one processor to determine a height of the CU; second determining code configured to cause the at least one processor to determine a width of the CU; third determining code configured to cause the at least one processor to determine a TU size of each of the one or more TUs based on the height of the CU and the width of the CU; fourth determining code configured to cause the at least one processor to determine one or more TU positions of the one or more TUs based on the height of the CU and the width of the CU; and partitioning code configured to cause the at least one processor to partition the CU into the one or more TUs based on the determined size of the one or more TUs and the one or more positions of the one or more TUs.

According to an embodiment, a non-transitory computer-readable medium storing instructions including one or more instructions that, when executed by one or more processors of a device for partitioning a coding unit (CU) into one or more transform units (TUs) for encoding a video sequence, cause the one or more processors to: determine a height of the CU; determining a width of the CU; determine a TU size of each of the one or more TUs based on the height of the CU and the width of the CU; determine one or more TU positions of the one or more TUs based on the height of the CU and the width of the CU; and partition the CU into the one or more TUs based on the determined size of the one or more TUs and the one or more positions of the one or more TUs.

BRIEF DESCRIPTION OF THE DRAWINGS

Further features, the nature, and various advantages of the disclosed subject matter will be more apparent from the following detailed description and the accompanying drawings in which:

FIG. 1 illustrates an example of a Quad Tree Binary Tree structure, according to an embodiment.

FIG. 10 is a simplified block diagram of a communication system according to an embodiment of the present disclosure.

FIG. 15 is a diagram of a computer system in accordance with an embodiment.

DETAILED DESCRIPTION

Figure 2B:
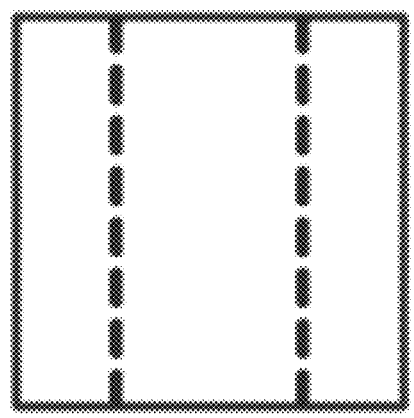
FIG. 2A and FIG. 2B illustrate examples of multi-type tree structures, according to an embodiment.

In HEVC, a coding tree unit (CTU) is split into coding units (CUs) by using a quadtree structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. A feature of the HEVC structure is that it has the multiple partition conceptions including CU, PU, and TU. In HEVC, a CU or a TU can only be square shape, while a PU may be square or rectangular shape for an inter predicted block. In HEVC, one coding block may be further split into four square sub-blocks, and transform is performed on each sub-block, i.e., TU. Each TU can be further split recursively (using quadtree split) into smaller TUs, which is called Residual Quad-Tree (RQT).

At a picture boundary, HEVC employs implicit quad-tree split so that a block will keep quad-tree splitting until the size fits the picture boundary.

In HEVC, a CTU is split into CUs by using a quadtree structure denoted as coding tree to adapt to various local characteristics. The decision on whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. One of key features of the HEVC structure is that it has the multiple partition conceptions including CU, PU, and TU.

A Quad Tree Binary Tree (QTBT) structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 1, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:
CTU size: the root node size of a quadtree, the same concept as in HEVC
MinQTSize: the minimum allowed quadtree leaf node size
MaxBTSize: the maximum allowed binary tree root node size
MaxBTDepth: the maximum allowed binary tree depth
MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

The left portion of FIG. 1 illustrates an example of block partitioning by using QTBT, and the right portion of FIG. 1 illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the flexibility for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

Figure 2A:
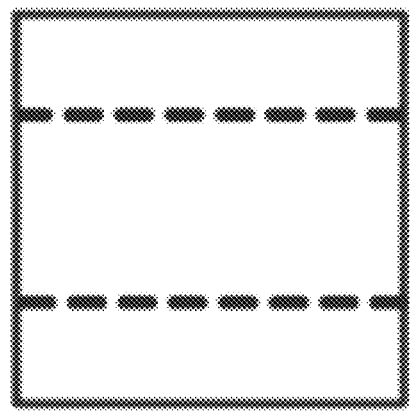

A Multi-type-tree (MTT) structure may be a more flexible tree structure than QTBT. In MTT, other than quad-tree and binary-tree, horizontal and vertical center-side triple-trees are introduced, as shown in FIGS. 2A and 2B. Specifically, FIG. 2A illustrates an example of vertical center-side triple-tree partitioning, and FIG. 2A illustrates an example of horizontal center-side triple-tree partitioning Triple-tree partitioning may complement quad-tree and binary-tree partitioning, because triple-tree partitioning is able to capture objects which locate in block center while quad-tree and binary-tree are always splitting along block center. In addition, the width and height of the partitions of the proposed triple trees are always power of 2 so that no additional transforms are needed.

The design of a two-level tree may be motivated by complexity reduction. Theoretically, the complexity of traversing of a tree is TAD, where T denotes the number of split types, and D is the depth of tree.

In HEVC, the primary transforms are 4-point, 8-point, 16-point and 32-point DCT-2, and the transform core matrices are represented using 8-bit integers, i.e., 8-bit transform core. The transform core matrices of smaller DCT-2 are part of larger DCT-2, as shown below:

TABLE 1

4 × 4 transform

{64, 64, 64, 64}
{83, 36, −36, −83}
{64, −64, −64, 64}
{36, −83, 83, −36}

TABLE 2

8 × 8 transform

{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

TABLE 3

16 × 16 transform

{64 64 64 64 64 64 64 64 64 64 64 64 64 64 64 64}
{90 87 80 70 57 43 25 9 −9 −25 −43 −57 −70 −80 −87 −90}
{89 75 50 18 −18 −50 −75 −89 −89 −75 −50 −18 18 50 75 89}
{87 57 9 −43 −80 −90 −70 −25 25 70 90 80 43 −9 −57 −87}
{83 36 −36 −83 −83 36 36 83 83 36 −36 −83 −83 −36 36 83}
{80 9 −70 −87 −25 57 90 43 −43 −90 −57 25 87 70 −9 −80}
{75 −18 −89 −50 50 39 18 −75 −75 18 89 50 −50 −89 −18 75}
{70 −43 −37 9 90 25 −80 −57 57 80 −25 −90 −9 87 43 −70}
{64 −64 −64 64 64 −64 −64 64 64 −64 −64 64 64 −64 −64 64}
{57 −80 −25 90 −9 −87 43 70 −70 −43 87 9 −90 25 80 −57}
{50 −89 18 75 −75 −18 89 −50 −50 89 −18 −75 75 18 −89 50}
{43 −90 57 25 −87 70 9 −80 80 −9 −70 87 −25 −57 90 −43}
{36 −83 83 −36 −36 83 −83 36 36 −83 83 −36 −36 83 −83 36}
{25 −70 90 −80 43 9 −57 87 −87 57 −9 −43 80 −90 70 −25}
{18 −50 75 −89 89 −75 50 −18 −18 50 −75 89 −89 75 −50 18}
{9 −25 43 −57 70 −80 87 −90 90 −87 80 −70 57 −43 25 −9}

TABLE 4

32 × 32 transform

{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4 −13 −22 −31 −38 −46 −54 −61 −67 −73 −78 −82 −85 −88 −90 −90}
{90 87 80 70 57 43 25 9 −9 −25 −43 −57 −70 −80 −87 −90 −90 −87 −80 −70 −57 −43 −25 −9 9 25 43 57 70 80 87 90}
{90 82 67 46 22 −4 −31 −54 −73 −85 −90 −88 −78 −61 −38 −13 13 38 61 78 88 90 85 73 54 31 4 −22 −46 −67 −82 −90}
{89 75 50 18 −18 −50 −75 −89 −89 −75 −50 −18 18 50 75 89 89 75 50 18 −18 −50 −75 −89 −89 −75 −50 −18 18 50 75 89}
{88 67 31 −13 −54 −82 −90 −78 −46 −4 38 73 90 85 61 22 −22 −61 −85 −90 −73 −38 4 46 78 90 82 54 13 −31 −67 −88}
{87 57 9 −43 −80 −90 −70 −25 25 70 90 80 43 −9 −57 −87 −87 −57 −9 43 80 90 70 25 −25 −70 −90 −80 −43 9 57 87}
{85 46 −13 −67 −90 −73 −22 38 82 88 54 −4 −61 −90 −78 −31 31 78 90 61 4 −54 −88 −82 −38 22 73 90 67 13 −46 −85}
{83 36 −36 −83 −83 −36 36 83 83 36 −36 −83 −83 −36 36 83 83 36 −36 −83 −83 −36 36 83 83 36 −36 −83 −83 −36 36 83}
{82 22 −54 −90 −61 13 78 85 31 −46 −90 −67 4 73 88 38 −38 −88 −73 −4 67 90 46 −31 −85 −78 −13 61 90 54 −22 −82}
{80 9 −70 −87 −25 57 90 43 −43 −90 −57 25 87 70 −9 −80 −80 −9 70 87 25 −57 −90 −43 43 90 57 −25 −87 −70 9 80}
{78 −4 −82 −73 13 85 67 −22 −88 −61 31 90 54 −38 −90 −46 46 90 38 −54 −90 −31 61 88 22 −67 −85 −13 73 82 4 −78}
{75 −18 −89 −50 50 89 18 −75 −75 18 89 50 −50 −89 −18 75 75 −18 −89 −50 50 89 18 −75 −75 18 89 50 −50 −89 −18 75}
{73 −31 −90 −22 78 67 −38 −90 −13 82 61 −46 −88 −4 85 54 −54 −85 4 88 46 −61 −82 13 90 38 −67 −78 22 90 31 −73}
{70 −43 −87 9 90 25 −80 −57 57 80 −25 −90 −9 87 43 −70 −70 43 87 −9 −90 −25 80 57 −57 −80 25 90 9 −87 −43 70}
{67 −54 −78 38 85 −22 −90 4 90 13 −88 −31 82 46 −73 −61 61 73 −46 −82 31 88 −13 −90 −4 90 22 −85 −38 78 54 −67}
{64 −64 −64 64 64 −64 −64 64 64 −64 −64 64 64 −64 −64 64 64 −64 −64 64 64 −64 −64 64 64 −64 −64 64 64 −64 −64 64}
{61 −73 −46 82 31 −88 −13 90 −4 −90 22 85 −38 −78 54 67 −67 −54 78 38 −85 −22 90 4 −90 13 88 −31 −82 46 73 −61}
{57 −80 −25 90 −9 −87 43 70 −70 −43 87 9 −90 25 80 −57 −57 80 25 −90 9 87 −43 −70 70 43 −87 −9 90 −25 −80 57}
{54 −85 −4 88 −46 −61 82 13 −90 38 67 −78 −22 90 −31 −73 73 31 −90 22 78 −67 −38 90 −13 −82 61 46 −88 4 85 −54}
{50 −89 18 75 −75 −18 89 −50 −50 89 −18 −75 75 18 −89 50 50 −89 18 75 −75 −18 89 −50 −50 89 −18 −75 75 18 −89 50}
{46 −90 38 54 −90 31 61 −88 22 67 −85 13 73 −82 4 78 −78 −4 82 −73 −13 85 −67 −22 88 −61 −31 90 −54 −38 90 −46}
{43 −90 57 25 −87 70 9 −80 80 −9 −70 87 −25 −57 90 −43 −43 90 −57 −25 87 −70 −9 80 −80 9 70 −87 25 57 −90 43}
{38 −88 73 −4 −67 90 −46 −31 85 −78 13 61 −90 54 22 −82 82 −22 −54 90 −61 −13 78 −85 31 46 −90 67 4 −73 88 −38}
{36 −83 83 −36 −36 83 −83 36 36 −83 83 −36 −36 83 −83 36 36 −83 83 −36 −36 83 −83 36 36 −83 83 −36 −36 83 −83 36}
{31 −78 90 −61 4 54 −88 82 −38 −22 73 −90 67 −13 −46 85 −85 46 13 −67 90 −73 22 38 −82 88 −54 −4 61 −90 78 −31}
{25 −70 90 −80 43 9 −57 87 −87 57 −9 −43 80 −90 70 −25 −25 70 −90 80 −43 −9 57 −87 87 −57 9 43 −80 90 −70 25}
{22 −61 35 −90 73 −38 −4 46 −78 90 −82 54 −13 −31 67 −88 88 −67 31 13 −54 82 −90 78 −46 4 38 −73 90 −85 61 −22}
{18 −50 75 −89 89 −75 50 −18 −18 50 −75 89 −89 75 −50 18 18 −50 75 −89 89 −75 50 −18 −18 50 −75 89 −89 75 −50 18}
{13 −38 61 −78 88 −90 85 −73 54 −31 4 22 −46 67 −82 90 −90 82 −67 46 −22 −4 31 −54 73 −85 90 −88 78 −61 38 −13}
{9 −25 43 −57 70 −80 87 −90 90 −87 80 −70 57 −43 25 −9 −9 25 −43 57 −70 80 −87 90 −90 87 −80 70 −57 43 −25 9}
{4 −13 22 −31 38 −46 54 −61 67 −73 78 −82 85 −88 90 −90 90 −90 88 −85 82 −78 73 −67 61 −54 46 −38 31 −22 13 −4}

The DCT-2 cores show symmetry/anti-symmetry characteristics, thus a so-called "partial butterfly" implementation is supported to reduce the number of operation counts (multiplications, adds/subs, shifts), and identical results of matrix multiplication can be obtained using partial butterfly.

In current VVC, besides 4-point, 8-point, 16-point and 32-point DCT-2 transforms which are same with HEVC, additional 2-point and 64-point DCT-2 are also included.

The 64-point DCT-2 core defined in VVC is shown below as a 64×64 matrix in Table 5:

TABLE 5

{
{aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa, aa, aa, aa}
{bf, bg, bh, bi, bj, bk, bl, bm, bn, bo, bp, bq, br, bs, bt, bu, bv, bw, bx, by, bz, ca,
cb, cc, cd, ce, cf, eg, ch, ci, cj, ck, -ck, -cj, -ci, -ch, -eg, -cf, -ce, -cd, -cc, -cb, -ca, -bz, -by,
-bx, -bw, -bv, -bu, -bt, -bs, -br, -bq, -bp, -bo, -bn, -bm, -bl, -bk, -bj, -bi, -bh, -bg, -bf}
{ap, aq, ar, as, at, au, av, aw, ax, ay, az, ba, bb, bc, bd, be, -be, -bd, -bc, -bb, -ba, -az,
-ay, -ax, -aw, -av, -au, -at, -as, -ar, -aq, -ap, -ap, -aq, -ar, -as, -at, -au, -av, -aw, -ax, -ay, -az, -ba,
-bb, -bc, -bd, -be, be, bd, bc, bb, ba, az, ay, ax, aw, av, au, at, as, ar, aq, ap}
{bg, bj, bm, bp, bs, bv, by, cb, ce, ch, ck, -ci, -cf, -cc, -bz, -bw, -bt, -bq, -bn, -bk, -bh, -bf,
-bi, -bl, -bo, -br, -bu, -bx, -ca, -cd, -cg, -cj, cj, cg, cd, ca, bx, bu, br, bo, bl, bi, bf, bh, bk,
bn, bq, bt, bw, bz, cc, cf, ci, -ck, -ch, -ce, -cb, -by, -bv, -bs, -bp, -bm, -bj, -bg}
{ah, ai, aj, ak, al, am, an, ao, -ao, -an, -am, -al, -ak, -aj, -ai, -ah, -ah, -ai, -aj, -ak, -al, -am,
-an, -ao, ao, an, am, al, ak, aj, ai, ah, ah, ai, aj, ak, al, am, an, ao, -ao, -an, -am, -al, -ak,
-aj, -ai, -ah, -ah, -ai, -aj, -ak, -al, -am, -an, -ao, ao, an, am, al, ak, aj, ai, ah}
{bh, bm, br, bw, cb, cg, -ck, -cf, -ca, -bv, -bq, -bl, -bg, -bi, -bn, -bs, -bx, -cc, -ch, cj, ce, bz,
bu, bp, bk, bf, bj, bo, bt, by, cd, ci, -ci, -cd, -by, -bt, -bo, -bj, -bf, -bk, -bp, -bu, -bz, -ce, -cj,
ch, cc, bx, bs, bn, bi, bg, bl, bq, bv, ca, cf, ck, -cg, -cb, -bw, -br, -bm, -bh}
{aq, at, aw, az, bc, -be, -bb, -ay, -av, -as, -ap, -ar, -au, -ax, -ba, -bd, bd, ba, ax, au, ar, ap,
as, av, ay, bb, be, -bc, -az, -aw, -at, -aq, -aq, -at, -aw, -az, -bc, be, bb, ay, av, as, ap, ar, au,
ax, ba, bd, -bd, -ba, -ax, -au, -ar, -ap, -as, -av, -ay, -bb, -be, bc, az, aw, at, aq}
{bi, bp, bw, cd, ck, -ce, -bx, -bq, -bj, -bh, -bo, -bv, -cc, -cj, cf, by, br, bk, bg, bn, bu, cb,
ci, -cg, -bz, -bs, -bl, -bf, -bm, -bt, -ca, -ch, ch, ca, bt, bm, bf, bl, bs, bz, cg, -ci, -cb, -bu, -bn,
-bg, -bk, -br, -by, -cf, cj, cc, bv, bo, bh, bj, bq, bx, ce, -ck, -cd, -bw, -bp, -bi}
{ad, ae, af, ag, -ag, -af, -ae, -ad, -ad, -ae, -af, -ag, ag, af, ae, ad, ad, ae, af, ag, -ag, -af,
-ae, -ad, -ad, -ae, -af, -ag, ag, af, ae, ad, ad, ae, af, ag, -ag, -af, -ae, -ad, -ad, -ae, -af, -ag, ag,
af, ae, ad, ad, ae, af, ag, -ag, -af, -ae, -ad, -ad, -ae, -af, -ag, ag, af, ae, ad}
{bj, bs, cb, ck, -cc, -bt, -bk, -bi, -br, -ca, -cj, cd, bu, bl, bh, bq, bz, ci, -ce, -bv, -bm, -bg,
-bp, -by, -ch, cf, bw, bn, bf, bo, bx, cg, -cg, -bx, -bo, -bf, -bn, -bw, -cf, ch, by, bp, bg, bm,
bv, ce, -ci, -bz, -bq, -bh, -bl, -bu, -cd, cj, ca, br, bi, bk, bt, cc, -ck, -cb, -bs, -bj}
{ar, aw, bb, -bd, -ay, -at, -ap, -au, -az, -be, ba, av, aq, as, ax, bc, -bc, -ax, -as, -aq, -av, -ba,
be, az, au, ap, at, ay, bd, -bb, -aw, -ar, -ar, -aw, -bb, bd, ay, at, ap, au, az, be, -ba, -av, -aq,
-as, -ax, -bc, bc, ax, as, aq, av, ba, -be, -az, -au, -ap, -at, -ay, -bd, bb, aw, ar}
{bk, bv, cg, -ce, -bt, -bi, -bm, -bx, -ci, cc, br, bg, bo, bz, ck, -ca, -bp, -bf, -bq, -cb, -cj, cj, by,
bn, bh, bs, cd, -ch, -bw, -bl, -bj, -bu, -cf, cf, bu, bj, bl, bw, ch, -cd, -bs, -bh, -bn, -by, -cj,
cb, bq, bf, bp, ca, -ck, -bz, -bo, -bg, -br, -cc, ci, bx, bm, bi, bt, ce, -cg, -bv, -bk}
{ai, al, ao, -am, -aj, -ah, -ak, -an, an, ak, ah, aj, am, -ao, -al, -ai, -ai, -al, -ao, am, aj, ah,
ak, an, -an, -ak, -ah, -aj, -am, ao, al, ai, ai, al, ao, -am, -aj, -ah, -ak, -an, an, ak, ah, aj, am,
-ao, -al, -ai, -ai, -al, -ao, am, aj, ah, ak, an, -an, -ak, -ah, -aj, -am, ao, al, ai}
{bl, by, -ck, -bx, -bk, -bm, -bz, cj, bw, bj, bn, ca, -ci, -bv, -bi, -bo, -cb, ch, bu, bh, bp, eo,
-cg, -bt, -bg, -bq, -cd, cf, bs, bf, br, ce, -ce, -br, -bf, -bs, -cf, cd, bq, bg, bt, cg, -cc, -bp, -bh,
-bu, -ch, cb, bo, bi, bv, ci, -ca, -bn, -bj, -bw, -cj, bz, bm, bk, bx, ck, -by, -bl}
{as, az, -bd, -aw, -ap, -av, -bc, ba, at, ar, ay, -be, -ax, -aq, -au, -bb, bb, au, aq, ax, be, -ay,
-ar, -at, -ba, bc, av, ap, aw, bd, -az, -as, -as, -az, bd, aw, ap, av, bc, -ba, -at, -ar, -ay, be,
ax, aq, au, bb, -bb, -au, -aq, -ax, -be, ay, ar, at, ba, -bc, -av, -ap, -aw, -bd, az, as}
{bm, cb, -cf, -bq, -bi, -bx, cj, bu, bf, bt, ci, -by, -bj, -bp, -ce, cc, bn, bl, ca, -cg, -br, -bh,
-bw, ck, bv, bg, bs, ch, -bz, -bk, -bo, -cd, cd, bo, bk, bz, -ch, -bs, -bg, -bv, -ck, bw, bh, br,
cg, -ca, -bl, -bn, -cc, ce, bp, bj, by, -ci, -bt, -bf, -bu, -cj, bx, bi, bq, cf, -cb, -bm}
{ab, ac, -ac, -ab, -ab, -ac, ac, ab, ab, ac, -ac, -ab, -ab, -ac, ac, ab, ab, ac, -ac, -ab, -ab, -ac,
ac, ab, ab, ac, -ac, -ab, -ab, -ac, ac, ab, ab, ac, -ac, -ab, -ab, -ac, ac, ab, ab, ac, -ac, -ab, -ab,
-ac, ac, ab, ab, ac, -ac, -ab, -ab, -ac, ac, ab, ab, ac, -ac, -ab, -ab, -ac, ac, ab}
{bn, ce, -ca, -bj, -br, -ci, bw, bf, bv, -cj, -bs, -bi, -bz, cf, bo, bm, cd, -cb, -bk, -bq, -ch, bx,
bg, bu, -ck, -bt, -bh, -by, cg, bp, bl, cc, -cc, -bl, -bp, -cg, by, bh, bt, ck, -bu, -bg, -bx, ch,
bq, bk, cb, -cd, -bm, -bo, -cf, bz, bi, bs, cj, -bv, -bf, -bw, ci, br, bj, ca, -ce, -bn}
{at, bc, -ay, -ap, -ax, bd, au, as, bb, -az, -aq, -aw, be, av, ar, ba, -ba, -ar, -av, -be, aw, aq,
az, -bb, -as, -au, -bd, ax, ap, ay, -bc, -at, -at, -bc, ay, ap, ax, -bd, -au, -as, -bb, az, aq, aw,
-be, -av, -ar, -ba, ba, ar, av, be, -aw, -aq, -az, bb, as, au, bd, -ax, -ap, -ay, bc, at}
{bo, ch, -bv, -bh, -ca, cc, bj, bt, -cj, -bq, -bm, -cf, bx, bf, by, -ce, -bl, -br, -ck, bs, bk, cd,
-bz, -bg, -bw, cg, bn, bp, ci, -bu, -bi, -cb, cb, bi, bu, -ci, -bp, -bn, -cg, bw, bg, bz, -cd, -bk,
-bs, ck, br, bl, ce, -by, -bf, -bx, cf, bm, bq, cj, -bt, -bj, -cc, ca, bh, bv, -ch, -bo}
{aj, ao, -ak, -ai, -an, al, ah, am, -am, -ah, -al, an, ai, ak, -ao, -aj, -aj, -ao, ak, ai, an, -al,
-ah, -am, am, ah, al, -an, -ai, -ak, ao, aj, aj, ao, -ak, -ai, -an, al, ah, am, -am, -ah, -al, an, ai,
ak, -ao, -aj, -aj, -ao, ak, ai, an, -al, -ah, -am, am, ah, al, -an, -ai, -ak, ao, aj}
{bp, ck, -bq, -bo, -cj, br, bn, ci, -bs, -bm, -ch, bt, bl, cg, -bu, -bk, -cf, bv, bj, ce, -bw, -bi,
-cd, bx, bh, cc, -by, -bg, -cb, bz, bf, ca, -ca, -bf, -bz, cb, bg, by, -cc, -bh, -bx, cd, bi, bw, -ce,
-bj, -bv, cf, bk, bu, -cg, -bl, -bt, ch, bm, bs, -ci, -bn, -br, cj, bo, bq, -ck, -bp}
{au, -be, -at, -av, bd, as, aw, -bc, -ar, -ax, bb, aq, ay, -ba, -ap, -az, az, ap, ba, -ay, -aq, -bb,
ax, ar, bc, -aw, -as, -bd, av, at, be, -au, -au, be, at, av, -bd, -as, -aw, bc, ar, ax, -bb, -aq, -ay,
ba, ap, az, -az, -ap, -ba, ay, aq, bb, -ax, -ar, -bc, aw, as, bd, -av, -at, -be, au}
{bq, -ci, -bl, -bv, cd, bg, ca, -by, -bi, -cf, bt, bn, ck, -bo, -bs, cg, bj, bx, -cb, -bf, -cc, bw,
bk, ch, -br, -bp, -ce, -bh, -bz, bz, bh, ce, bp, br, -ch, -bk, -bw, cc, bf, cb, -bx, -bj, -cg, bs, bo, -ck, -bn, -bt, cf, bi, by, -ca, -bg, -cd, bv, bl, ci, -bq}
bf, cb, -bx, -bj, -cg, bs, bo, -ck, -bn, -bt, cf, bi, by, -ca, -bg, -cd, bv, bl, ci, -bq}

TABLE 5-continued

{ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae}
{br, -cf, -bg, -cc, bu, bo, -ci, -bj, -bz, bx, bl, ck, -bm, -bw, ca, bi, ch, -bp, -bt, cd, bf, ce, -bs, -bq, cg, bh, cb, -bv, -bn, cj, bk, by, -by, -bk, -cj, bn, bv, -cb, -bh, -cg, bq, bs, -ce, -bf, -cd, bt, bp, -ch, -bi, -ca, bw, bm, -ck, -bl, -bx, bz, bj, ci, -bo, -bu, cc, bg, cf, -br}
{av, -bb, -ap, -bc, au, aw, -ba, -aq, -bd, at, ax, -az, -ar, -be, as, ay, -ay, -as, be, ar, az, -ax, -at, bd, aq, ba, -aw, -au, bc, ap, bb, -av, -av, bb, ap, bc, -au, -aw, ba, aq, bd, -at, -ax, az, ar, be, -as, -ay, ay, as, -be, -ar, -az, ax, at, -bd, -aq, -ba, aw, au, -bc, -ap, -bb, av}
{bs, -cc, -bi, -cj, bl, bz, -bv, -bp, cf, bf, cg, -bo, -bw, by, bm, -ci, -bh, -cd, br, bt, -cb, -bj, -ck, bk, ca, -bu, -bq, ce, bg, ch, -bn, -bx, bx, bn, -ch, -bg, -ce, bq, bu, -ca, -bk, ck, bj, cb, -bt, -br, cd, bh, ci, -bm, -by, bw, bo, -cg, -bf, -cf, bp, bv, -bz, -bl, cj, bi, cc, -bs}
{ak, -am, -ai, ao, ah, an, -aj, -al, aj, al, aj, -an, -ah, -ao, ai, am, -ak, am, ai, -ao, -ah, -an, aj, al, -al, -aj, an, ah, ao, -ai, -am, ak, ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak}
{bt, -bz, -bn, cf, bh, ck, -bi, -ce, bo, by, -bu, -bs, ca, bm, -cg, -bg, -cj, bj, cd, -bp, -bx, bv, br, -cb, -bl, ch, bf, ci, -bk, -cc, bq, bw, -bw, -bq, cc, bk, -ci, -bf, -ch, bl, cb, -br, -bv, bx, bp, -cd, -bj, cj, bg, cg, -bm, -ca, bs, bu, -by, -bo, ce, bi, -ck, -bh, -cf, bn, bz, -bt}
{aw, -ay, -au, ba, as, -be, -aq, be, ap, bd, -ar, -bb, at, az, -av, -ax, ax, av, -az, -at, bb, ar, -bd, -ap, -be, aq, bc, -as, -ba, au, ay, -aw, -aw, ay, au, -ba, -as, bc, aq, -be, -ap, -bd, ar, bb, -at, -az, av, ax, -ax, -av, az, at, -bb, -ar, bd, ap, be, -aq, -bc, as, ba, -au, -ay, aw}
{bu, -bw, -bs, by, bq, -ca, -bo, cc, bm, -ce, -bk, cg, bi, -ci, -bg, ck, bf, cj, -bh, -ch, bj, cf, -bl, -cd, bn, cb, -bp, -bz, br, bx, -bt, -bv, bv, bt, -bx, -br, bz, bp, -cb, -bn, cd, bl, -cf, -bj, ch, bh, -cj, -bf, -ck, bg, ci, -bi, -cg, bk, ce, -bm, -cc, bo, ca, -bq, -by, bs, bw, -bu}
{aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa}
{bv, -bt, -bx, br, bz, -bp, -cb, bn, cd, -bl, -cf, bj, ch, -bh, -cj, bf, -ck, -bg, ci, bi, -cg, -bk, ce, bm, -cc, -bo, ca, bq, -by, -bs, bw, bu, -bu, -bw, bs, by, -bq, -ca, bo, cc, -bm, -ce, bk, cg, -bi, -ci, bg, ck, -bf, cj, bh, -ch, -bj, cf, bl, -cd, -bn, cb, bp, -bz, -br, bx, bt, -bv}
{ax, -av, -az, at, bb, -ar, -bd, ap, -be, -aq, bc, as, -ba, -au, ay, aw, -aw, -ay, au, ba, -as, -bc, aq, be, -ap, bd, ar, -bb, -at, az, av, -ax, -ax, av, az, -at, -bb, ar, bd, -ap, be, aq, -bc, -as, ba, au, -ay, -aw, aw, ay, -au, -ba, as, bc, -aq, -be, ap, -bd, -ar, bb, at, -az, -av, ax}
{bw, -bq, -cc, bk, ci, -bf, ch, bl, -cb, -br, bv, bx, -bp, -cd, bj, cj, -bg, cg, bm, -ca, -bs, bu, by, -bo, -ce, bi, ck, -bh, cf, bn, -bz, -bt, bt, bz, -bn, -cf, bh, -ck, -bi, ce, bo, -by, -bu, bs, ca, -bm, -cg, bg, -cj, -bj, cd, bp, -bx, -bv, br, cb, -bl, -ch, bf, -ci, -bk, cc, bq, -bw}
{al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al, -am, -ak, ak, am, -ai, -ao, ah, -an, -aj, al, al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al}
{bx, -bn, -ch, bg, -ce, -bq, bu, ca, -bk, -ck, bj, -cb, -bt, br, cd, -bh, ci, bm, -by, -bw, bo, cg, -bf, cf, bp, -bv, -bz, bl, cj, -bi, cc, bs, -bs, -cc, bi, -cj, -bl, bz, bv, -bp, -cf, bf, -cg, -bo, bw, by, -bm, -ci, bh, -cd, -br, bt, cb, -bj, ck, bk, -ca, -bu, bq, ce, -bg, ch, bn, -bx}
{ay, -as, -be, ar, -az, -ax, at, bd, -aq, ba, aw, -au, -bc, ap, -bb, -av, av, bb, -ap, bc, au, -aw, -ba, aq, -bd, -at, ax, az, -ar, be, as, -ay, -ay, as, be, -ar, az, ax, -at, -bd, aq, -ba, -aw, au, bc, -ap, bb, av, -av, -bb, ap, -bc, -au, aw, ba, -aq, bd, at, -ax, -az, ar, -be, -as, ay}
{by, -bk, cj, bn, -bv, -cb, bh, -cg, -bq, bs, ce, -bf, cd, bt, -ca, -bw, bm, ck, -bl, bx, bz, -bj, ci, bo, -bu, -cc, bg, -cf, -br, br, cf, -bg, cc, bu, -bo, -ci, bj, -bz, -bx, bl, -ck, -bm, bw, ca, -bi, ch, bp, -bt, -cd, bf, -ce, -bs, bq, cg, -bh, cb, bv, -bn, -cj, bk, -by}
{af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af}
{bz, -bh, ce, bu, -bm, cj, bp, -br, -ch, bk, -bw, -cc, bf, -cb, -bx, bj, -cg, -bs, bo, ck, -bn, bt, cf, -bi, by, ca, -bg, cd, bv, -bl, ci, bq, -bq, -ci, bl, -bv, -cd, bg, -ca, -by, bi, -cf, -bt, bn, -ck, -bo, bs, cg, -bj, bx, cb, -bf, cc, bw, -bk, ch, br, -bp, -cj, bm, -bu, -ce, bh, -bz}
{az, -ap, ba, ay, -aq, bb, ax, -ar, bc, aw, -as, bd, av, -at, be, au, -au, -be, at, -av, -bd, as, -aw, -bc, ar, -ax, -bb, aq, -ay, -ba, ap, -az, -az, ap, -ba, -ay, aq, -bb, -ax, ar, -bc, -aw, as, -bd, -av, at, -be, -au, au, be, -at, av, bd, -as, aw, bc, -ar, ax, bb, -aq, ay, ba, -ap, az}
{ca, -bf, bz, cb, -bg, by, cc, -bh, bx, cd, -bi, bw, ce, -bj, bv, cf, -bk, bu, cg, -bl, bt, ch, -bm, bs, ci, -bn, br, cj, -bo, bq, ck, -bp, bp, -ck, -bq, bo, -cj, -br, bn, -ci, -bs, bm, -ch, -bt, bl, -cg, -bu, bk, -cf, -bv, bj, -ce, -bw, bi, -cd, -bx, bh, -cc, -by, bg, -bz, bf, -ca}
{am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am, am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am}
{cb, -bi, bu, ci, -bp, bn, -cg, -bw, bg, -bz, -cd, bk, -bs, -ck, br, -bl, ce, by, -bf, bx, cf, -bm, bq, -cj, -bt, bj, -cc, -ca, bh, -bv, -ch, bo, -bo, ch, bv, -bh, ca, cc, -bj, bt, cj, -bq, bm, -cf, -bx, bf, -by, -ce, bl, -br, ck, bs, -bk, cd, bz, -bg, bw, cg, -bn, bp, -ci, -bu, bi, -cb}
{ba, -ar, av, -be, -aw, aq, -az, -bb, as, -au, bd, ax, -ap, ay, bc, -at, at, -bc, -ay, ap, -ax, -bd, au, -as, bb, az, -aq, aw, be, -av, ar, -ba, -ba, ar, -av, be, aw, -aq, az, bb, -as, au, -bd, -ax, ap, -ay, -bc, at, -at, bc, ay, -ap, ax, bd, -au, as, -bb, -az, aq, -aw, -be, av, -ar, ba}
{cc, -bl, bp, -cg, -by, bh, -bt, ck, bu, -bg, bx, ch, -bq, bk, -cb, -cd, bm, -bo, cf, bz, -bi, bs, -cj, -bv, bf, -bw, -ci, br, -bj, ca, ce, -bn, bn, -ce, -ca, bj, -br, ci, bw, -bf, bv, cj, -bs, bi, -bz, -cf, bo, -bm, cd, cb, -bk, bq, -ch, -bx, bg, -bu, -ck, bt, -bh, by, cg, -bp, bl, -cc}
{ae, -ab, ab, -ac, -ac, ab, -ab, ae, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac, ac, -ab, ab, -ac, -ac, ab, -ab, ac}
{cd, -bo, bk, -bz, -ch, bs, -bg, bv, -ck, -bw, bh, -br, cg, ca, -bl, bn, -cc, -ce, bp, -bj, by, ci, -bt, bf, -bu, cj, bx, -bi, bq, -cf, -cb, bm, -bm, cb, cf, -bq, bi, -bx, -cj, bu, -bf, bt, -ci, -by, bj, -bp, ce, cc, -bn, bl, -ca, -cg, br, -bh, bw, ck, -bv, bg, -bs, ch, bz, -bk, bo, -cd}
{bb, -au, aq, -ax, be, ay, -ar, at, -ba, -bc, av, -ap, aw, -bd, -az, as, -as, az, bd, -aw, ap, -av, bc, ba, -at, ar, -ay, -be, ax, -aq, au, -bb, -bb, au, -aq, ax, -be, -ay, ar, -at, ba, bc, -av, ap, -aw, bd, az, -as, as, -az, -bd, aw, -ap, av, -bc, -ba, at, -ar, ay, be, -ax, aq, -au, bb,

TABLE 5-continued

```
-aw, bd, az, -as, as, -az, -bd, aw, -ap, av, -be, -ba, at, -ar, ay, be, -ax, aq, -au, bb}
{ce, -br, bf, -bs, cf, cd, -bq, bg, -bt, cg, cc, -bp, bh, -bu, ch, cb, -bo, bi, -bv, ci, ca, -bn,
bj, -bw, cj, bz, -bm, bk, -bx, ck, by, -bl, bl, -by, -ck, bx, -bk, bm, -bz, -cj, bw, -bj, bn, -ca,
-ci, bv, -bi, bo, -cb, -ch, bu, -bh, bp, -cc, -cg, bt, -bg, bq, -cd, -cf, bs, -bf, br, -ce}
{an, -ak, ah, -aj, am, ao, -al, ai, -ai, al, -ao, -am, aj, -ah, ak, -an, -an, ak, -ah, aj, -am, -ao,
al, -ai, ai, -al, ao, am, -aj, ah, -ak, an, an, -ak, ah, -aj, am, ao, -al, ai, -ai, al, -ao, -am, aj,
-ah, ak, -an, -an, ak, -ah, aj, -am, -ao, al, -ai, ai, -al, ao, am, -aj, ah, -ak, an}
{cf, -bu, bj, -bl, bw, -ch, -cd, bs, -bh, bn, -by, cj, cb, -bq, bf, -bp, ca, ck, -bz, bo, -bg, br,
-cc, -ci, bx, -bm, bi, -bt, ce, cg, -bv, bk, -bk, bv, -cg, -ce, bt, -bi, bm, -bx, ci, cc, -br, bg,
-bo, bz, -ck, -ca, bp, -bf, bq, -cb, -cj, by, -bn, bh, -bs, cd, ch, -bw, bl, -bj, bu, -cf}
{bc, -ax, as, -aq, av, -ba, -be, az, -au, ap, -at, ay, -bd, -bb, aw, -ar, ar, -aw, bb, bd, -ay, at,
-ap, au, -az, be, ba, -av, aq, -as, ax, -bc, -bc, ax, -as, aq, -av, ba, be, -az, au, -ap, at, -ay,
bd, bb, -aw, ar, -ar, aw, -bb, -bd, ay, -at, ap, -au, az, -be, -ba, av, -aq, as, -ax, bc}
{cg, -bx, bo, -bf, bn, -bw, cf, ch, -by, bp, -bg, bm, -bv, ce, ci, -bz, bq, -bh, bl, -bu, cd, cj,
-ca, br, -bi, bk, -bt, cc, ck, -cb, bs, -bj, bj, -bs, cb, -ck, -cc, bt, -bk, bi, -br, ca, -cj, -cd, bu,
-bl, bh, -bq, bz, -ci, -ce, bv, -bm, bg, -bp, by, -ch, -cf, bw, -bn, bf, -bo, bx, -cg}
{ag, -af, ae, -ad, ad, -ae, af, -ag, -ag, af, -ae, ad, -ad, ae, -af, ag, ag, -af, ae, -ad, ad, -ae,
af, -ag, -ag, af, -ae, ad, -ad, ae, -af, ag, ag, -af, ae, -ad, ad, -ae, af, -ag, -ag, af, -ae, ad, -ad,
ae, -af, ag, ag, -af, ae, -ad, ad, -ae, af, -ag, -ag, af, -ae, ad, -ad, ae, -af, ag}
{ch, -ca, bt, -bm, bf, -bl, bs, -bz, cg, ci, -cb, bu, -bn, bg, -bk, br, -by, cf, cj, -cc, bv, -bo,
bh, -bj, bq, -bx, ce, ck, -cd, bw, -bp, bi, -bi, bp, -bw, cd, -ck, -ce, bx, -bq, bj, -bh, bo, -bv,
cc, -cj, -cf, by, -br, bk, -bg, bn, -bu, cb, -ci, -cg, bz, -bs, bl, -bf, bm, -bt, ca, -ch}
{bd, -ba, ax, -au, ar, -ap, as, -av, ay, -bb, be, bc, -az, aw, -at, aq, -aq, at, -aw, az, -bc, -be,
bb, -ay, av, -as, ap, -ar, au, -ax, ba, -bd, -bd, ba, -ax, au, -ar, ap, -as, av, -ay, bb, -be, -c,
az, -aw, at, -aq, aq, -at, aw, -az, bc, be, -bb, ay, -av, as, -ap, ar, -au, ax, -ba, bd}
{ci, -cd, by, -bt, bo, -bj, bf, -bk, bp, -bu, bz, -ce, cj, ch, -cc, bx, -bs, bn, -bi, bg, -bl, bq,
-bv, ca, -cf, ck, cg, -cb, bw, -br, bm, -bh, bh, -bm, br, -bw, cb, -cg, -ck, cf, -ca, bv, -bq, bl,
-bg, bi, -bn, bs, -bx, cc, -ch, -cj, ce, -bz, bu, -bp, bk, -bf, bj, -bo, bt, -by, cd, -ci}
{ao, -an, am, -al, ak, -aj, ai, -ah, ah, -ai, aj, -ak, al, -am, an, -ao, -ao, an, -am, al, -ak, aj,
-ai, ah, -ah, ai, -aj, ak, -al, am, -an, ao, ao, -an, am, -al, ak, -aj, ai, -ah, ah, -ai, aj, -ak, al,
-am, an, -ao, -ao, an, -am, al, -ak, aj, -ai, ah, -ah, ai, -aj, ak, -al, am, -an, ao}
{cj, -cg, cd, -ca, bx, -bu, br, -bo, bl, -bi, bf, -bh, bk, -bn, bq, -bt, bw, -bz, cc, -cf, ci, ck,
-ch, ce, -cb, by, -bv, bs, -bp, bm, -bj, bg, -bg, bj, -bm, bp, -bs, bv, -by, cb, -ce, ch, -ck, -ci,
cf, -cc, bz, -bw, bt, -bq, bn, -bk, bh, -bf, bi, -bl, bo, -br, bu, -bx, ca, -cd, cg, -cj}
{be, -bd, bc, -bb, ba, -az, ay, -ax, aw, -av, au, -at, as, -ar, aq, -ap, ap, -aq, ar, -as, at, -au,
av, -aw, ax, -ay, az, -ba, bb, -bc, bd, -be, -bc, bd, -be, bb, -ba, az, -ay, ax, -aw, av, -au, at,
-as, ar, -aq, ap, -ap, aq, -ar, as, -at, au, -av, aw, -ax, ay, -az, ba, -bb, bc, -bd, be}
{ck, -cj, ci, -ch, cg, -cf, ce, -cd, cc, -cb, ca, -bz, by, -bx, bw, -bv, bu, -bt, bs, -br, bq, -bp,
bo, -bn, bm, -bl, bk, -bj, bi, -bh, bg, -bf, bf, -bg, bh, -bi, bj, -bk, bl, -bm, bn, -bo, bp, -bq,
br, -bs, bt, -bu, bv, -bw, bx, -by, bz, -ca, cb, -cc, cd, -ce, cf, -cg, ch, -ci, cj, -ck}
}
``` where $$\{aa,ab,ac,ad,ae,af,ag,ah,ai,aj,ak,al,am,an,ao,ap,aq,\\ar,as,at,au,av,aw,ax,ay,az,ba,\ bb,bc,bd,be,bf,bg,\\bh,bi,bj,bk,bl,bm,bn,bo,bp,bq,br,bs,bt,bu,by,bw,\\bx,by,bz,ca,\ cb,cc,cd,ce,cf,cg,ch,ci,cj,ck\}=\{64,\\83,36,89,75,50,18,90,87,80,70,57,43,25,9,90,90,\\88,85,82,78,73,67,61,54,46,38,31,22,13,4,9\ 1,90,\\90,90,88,87,86,84,83,81,79,77,73,71,69,65,62,\\59,56,52,48,44,41,37,33,28,24,20,15,11,7,2\}$$ (Equation 1)

In addition to DCT-2 and 4×4 DST-7 which have been employed in HEVC, an Adaptive Multiple Transform (AMT, which may be referred to as Enhanced Multiple Transform (EMT), or as Multiple Transform Selection (MTS)) scheme has been used in VVC for residual coding for both inter and intra coded blocks. It uses multiple selected transforms from the DCT/DST families other than the current transforms in HEVC. The newly introduced transform matrices are DST-7, DCT-8. Table 6 shows the basis functions of the selected DST/DCT.

TABLE 6

Transform basis functions of DCT-2, DST-7 and DCT-8 for N-point input

| Transform Type | Basis function $T_i(j)$, i, j = 0, 1, . . . , N-1 |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ |

TABLE 6-continued

Transform basis functions of DCT-2, DST-7 and DCT-8 for N-point input

| Transform Type | Basis function $T_i(j)$, i, j = 0, 1, . . . , N-1 |
|---|---|
| | where $\omega_0 = \begin{cases} \sqrt{\dfrac{2}{N}} & i = 0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

All the primary transform matrices in VVC are used with 8-bit representation. The AMT applies to the CUs with both width and height smaller than or equal to 32, and whether applying AMT or not is controlled by a flag called mts_flag. When the mts_flag is equal to 0, only DCT-2 is applied for coding the residue. When the mts_flag is equal to 1, an index mts_idx is further signalled using 2 bins to specify the horizontal and vertical transform to be used according to Table 7, where value 1 means using DST-7 and value 2 means using DCT-8.

TABLE 7

Specification of trTypeHor and trTypeVer depending on mts_idx[ x ][ y ][ cIdx ]

| mts_idx[ xTbY ][ yTbY ][ cIdx ] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

The transform core, which is a matrix composed by the basis vectors, of DST-7 can be also represented below:

TABLE 8

4-point DST-7:

{a, b, c, d}
{c, c, 0, -c}
{d, -a, -c, b}
{b, -d, c, -a} where $$\{a,b,c,d\}=\{29,55,74,84\} \quad \text{(Equation 2)}$$

TABLE 9

8-point DST-7:

{a, b, c, d, e, f, g, h,}
{c, f, h, e, b, -a, -d, -g,}
{e, g, b, -c, -h, -d, a, f,}

TABLE 9-continued 8-point DST-7:

{g, c, -d, -f a, h, b, -e,}
{h, -a, -g, b, f, -c, -e, d,}
{f, -e, -a, g, -d, -b, h, -c,}
{d, -h, e, -a, -c, g, -f, b,}
{b, -d, f, -h, g, -e, c, -a,} where $$\{a,b,c,d,e,f,g,h\}=\{17,32,46,60,71,78,85,86\} \quad \text{(Equation 3)}$$

TABLE 10

16-point DST-7:

{a, b, c, d, e, f, g, h, i, j, k, l, m, n, o, p,}
{c, f, i, l, o, o, l, i, f, c, 0, -c, -f, -i, -l, -o,}
{e, j, o, m, h, c, -b, -g, -l, -p, -k, -f -a, d, i, n,}
{g, n, l, e, -b, -i, -p, -j, -c, d, k, o, h, a, -f, -m,}
{i, o, f, -c, -l, -l, -c, f, o, i, 0, -i, -o, -f, c, l,}
{k, k, 0, -k, -k, 0, k, k, 0, -k, -k, 0, k, k, 0, -k,}
{m, g, -f, -n, -a, l, h, -e, -o, -b, k, i, -d, -p, -c, j,}
{o, c, -l, -f, i, i, -f, -l, c, o, 0, -o, -c, l, f, -i,}
{p, -a, -o, b, n, -c, -m, d, l, -e, -k, f, j, -g, -i, h,}
{n, -e, -i, j, d, -o, a, m, -f, -h, k, c, -p, b, l, -g,}
{i, -i, -c, o, -f, -f, o, -c, -i, l, 0, -l, i, c, -o, f,}
{j, -m, c, g, -p, f, d, -n, i, a, -k, l, -b, -h, o, -e,}
{h, -p, i, -a, -g, o, -j, b, f, -n, k, -c, -e, m, -l, d,}
{f, -l, o, -i, c, c, -i, o, -l, f, 0, -f, l, -o, i, -c,}
{d, -h, l, -p, m, -i, e, -a, -c, g, -k, o, -n, j, -f, b,}
{b, -d, f, -h, j, -l, n, -p, o, -m, k, -i, g, -e, c, -a,} where $$\{a,b,c,d,e,f,g,h,i,j,k,l,m,n,o,p\}=\{9,17,25,33,41,49,56,\\62,66,72,77,81,83,87,89,90\} \quad \text{(Equation 4)}$$

TABLE 11

32-point DST-7:

{a, b, c, d, e, f, g, h, i, j, k, l, m, n, o, p, q, r, s, t, u, v, w, x, y, z, A, B, C, D, E, F,}
{c, f, i, l, o, r, u, x, A, D, F, C, z, w, t, q, n, k, h, e, b, -a, -d, -g, -j, -m, -p, -s, -v, -y, -B, -E,}
{e, j, o, t, y, D, D, y, t, o, j, e, 0, -e, -j, -o, -t, -y, -D, -D, -y, -t, -o, -j, -e, 0, e, j, o, t, y, D,}
{g, n, u, B, D, w, p, i, b, -e, -l, -s, -z, -F, -y, -r, -k, -d, c, j, q, x, E, A, t, m, f, -a, -h, -o, -v, -C,}
{i, r, A, C, t, k, b, -g, -p, -y, -E, -v, -m, -d, e, n, w, F, x, o, f, -c, -l, -u, -D, -z, -q, -h, a, j, s, B,}
{k, v, F, u, j, -a, -l, -w, -E, -t, -i, b, m, x, D, s, h, -c, -n, -y, -C, -r, -g, d, o, z, B, q, f, -e, -p, -A,}
{m, z, z, m, 0, -m, -z, -z, -m, 0, m, z, z, m, 0, -m, -z, -z, -m, 0, m, z, z, m, 0, -m, -z, -z, -m, 0, m, z,}
{o, D, t, e, -j, -y, -y, -j, e, t, D, o, 0, -o, -D, -t, -e, j, y, y, j, -e, -t, -D, -o, 0, o, D, t, e, -j, -y,}
{q, E, n, -c, -t, -B, -k, f, w, y, h, -i, -z, -v, -e, l, C, s, b, -o, -F, -p, a, r, D, m, -d, -u, -A, -j, g, x,}
{s, A, h, -k, -D, -p, c, v, x, e, -n, -F, -m, f, y, u, b, -q, -C, -j, i, B, r, -a, -t, -z, -g, l, E, o, -d, -w,}
{u, w, b, -s, -y, -d, q, A, f, -o, -C, -h, m, E, j, -k, -F, -l, i, D, n, -g, -B, -p, e, z, r, -c, -x, -t, a, v,}
{w, s, -d, -A, -o, h, E, k, -l, -D, -g, p, z, c, -t, -v, a, x, r, -e, -B, -n, i, F, j, -m, -C, -f, q, y, b, -u,}
{y, o, -j, -D, -e, t, t, -e, -D, -j, o, y, 0, -y, -o, j, D, e, -t, -t, e, D, j, -o, -y, 0, y, o, -j, -D, -e, t,}
{A, k, -p, -v, e, F, f, -u, -q, j, B, a, -z, -l, o, w, -d, -E, -g, t, r, -i, -C, -b, y, m, -n, -x, c, D, h, -s,}
{C, g, -v, -n, o, u, -h, -B, a, D, f, -w, -m, p, t, -i, -A, b, E, e, -x, -l, q, s, -j, -z, c, F, d, -y, -k, r,}
{E, c, -B, -f, y, i, -v, -l, s, o, -p, -r, m, u, -j, -x, g, A, -d, -D, a, F, b, -C, -e, z, h, -w, -k, t, n, -q,}
{F, -a, -E, b, D, -c, -C, d, B, -e, -A, f, z, -g, -y, h, x, -i, -w, j, v, -k, -u, l, t, -m, -s, n, r, -o, -q, p,}
{D, -e, -y, j, t, -o, -o, t, j, -v, -e, D, 0, -D, e, y, -j, -t, o, o, -t, -j, y, e, -D, 0, D, -e, -y, j, t, -o,}
{B, -i, -s, r, j, -A, -a, C, -h, -t, q, k, -z, -b, D, -g, -u, p, l, -y, -c, E, -f, -v, o, m, -x, -d, F, -e, -w, n,}

TABLE 11-continued 32-point DST-7:

{z, -m, -m, z, 0, -z, m, m, -z, 0, z, -m, -m, z, 0, -z, m, m, -z, 0, z, -m, -m, z, 0, -z, m, m, -z, 0, z, -m,}
{x, -q, -g, E, -j, -n, A, -c, -u, t, d, -B, m, k, -D, f, r, -w, -a, y, -p, -h, F, -i, -o, z, -b, -v, s, e, -C, l,}
{v, -u, -a, w, -t, -b, x, -s, -c, y, -r, -d, z, -q, -e, A, -p, -f, B, -o, -g, C, -n, -h, D, -m, -i, E, -l, -j, F, -k,}
{t, -y, e, o, -D, j, j, -D, o, e, -y, t, 0, -t, y, -e, -o, D, -j, -j, D, -o, -e, y, -t, 0, t, -y, e, o, -D, j,}
{r, -C, k, g, -y, v, -d, -n, F, -o, -c, u, -z, h, j, -B, s, -a, -q, D, -l, -f, x, -w, e, m, -E, p, b, -t, A, -i,}
{p, -F, q, -a, -o, E, -r, b, n, -D, s, -c, -m, C, -t, d, l, -B, u, -e, -k, A, -v, f, j, -z, w, -g, -i, y, -x, h,}
{n, -B, w, -i, -e, s, -F, r, -d, -j, x, -A, m, a, -o, C, -v, h, f, -t, E, -q, c, k, -y, z, -l, -b, p, -D, u, -g,}
{l, -x, C, -q, e, g, -s, E, -v, j, b, -n, z, -A, o, -c, -i, u, -F, t, -h, -d, p, -B, y, -m, a, k, -w, D, -r, f,}
{j, -t, D, -y, o, -e, -e, o, -y, D, -t, j, 0, -j, t, -D, y, -o, e, e, -o, y, -D, t, -j, 0, j, -t, D, -y, o, -e,}
{h, -p, x, -F, y, -q, i, -a, -g, o, -w, E, -z, r, -j, b, f, -n, v, -D, A, -s, k, -c, -e, m, -u, C, -B, t, -l, d,}
{f, -l, r, -x, D, -C, w, -q, k, -e, -a, g, -m, s, -y, E, -B, v, -p, j, -d, -b, h, -n, t, -z, F, -A, u, -o, i, -c,}
{d, -h, l, -p, t, -x, B, -F, C, -y, u, -q, m, -i, e, -a, -c, g, -k, o, -s, w, -A, E, -D, z, -v, r, -n, j, -f, b,}
{b, -d, f, -h, j, -l, n, -p, r, -t, v, -x, z, -B, D, -F, E, -C, A, -v, w, -u, s, -q, o, -m, k, -i, g, -e, c, -a,} where $$\{a,b,c,d,e,f,g,h,i,j,k,l,m,n,o,p,q,r,s,t,u,v,w,x,y,z,A,B,C,D,E,F\}=\{4,9,13,17,21,26,30,34,38,42,45,50,53,56,60,63,66,68,72,74,77,78,80,82,84,85,86,88,88,89,90,90\}$$ (Equation 5)

TABLE 12

4-point DCT-8:

{a, b, c, d,}
{b, 0, -b, -b,}
{c, -b, -d, a,}
{d, -b, a, -c,} where $$\{a,b,c,d\}=\{84,74,55,29\}$$ (Equation 6)

TABLE 13

8-point DCT-8:

{a, b, c, d, e, f, g, h,}
{b, e, h, -g, -d, -a, -c, -f,}
{c, h, -e, -a, -f, g, b, d,}
{d, -g, -a, -h, c, e, -f, -b,}
{e, -d, -f, c, g, -b, -h, a,}
{f, -a, g, e, -b, h, d, -c,}
{g, -c, b, -f, -h, d, -a, e,}
{h, -f, d, -b, a, -c, e, -g,} where $$\{a,b,c,d,e,f,g,h\}=\{86,85,78,71,60,46,32,17\}$$ (Equation 7)

TABLE 14

16-point DCT-8:

{a, b, c, d, e, f, g, h, i, j, k, l, m, n, o, p,}
{b, e, h, k, n, 0, -n, -k, -h, -e, -b, -b, -e, -h, -k, -n,}
{c, h, m, -p, -k, -f, -a, -e, -j, -o, n, i, d, b, g, l,}
{d, k, -p, -i, -b, -f, -m, n, g, a, h, o, -l, -e, -c, -j,}
{e, n, -k, -b, -h, 0, h, b, k, -n, -e, -e, -n, k, b, h,}
{f, 0, -f, -f, 0, f, f, 0, -f, -f, 0, f, f, 0, -f, -f,}
{g, -n, -a, -m, h, f, -o, -b, -l, i, e, -p, -c, -k, j, d,}
{h, -k, -e, n, b, 0, -b, -n, e, k, -h, -h, k, e, -n, -b,}
{i, -h, -j, g, k, -f, -l, e, m, -d, -n, c, o, -b, -p, a,}
{j, -e, -o, a, -n, -f, i, k, -d, -p, b, -m, -g, h, l, -c,}
{k, -b, n, h, -e, 0, e, -h, -n, b, -k, -k, b, -n, -h, e,}
{l, -b, i, o, -e, f, -p, -h, c, -m, -k, a, -j, -n, d, -g,}
{m, -e, d, -l, -n, f, -c, k, o, -g, b, -j, -p, h, -a, i,}
{n, -h, b, -e, k, 0, -k, e, -b, h, -n, -n, h, -b, e, -k,}
{o, -k, g, -c, b, -f, j, -e, -p, l, -h, d, -a, e, -i, m,}
{p, -n, l, -j, h, -f, d, -b, a, -c, e, -g, i, -k, m, -o,} where $$\{a,b,c,d,e,f,g,h,i,j,k,l,m,n,o,p\}=\{90,89,87,83,81,77,72,66,62,56,49,41,33,25,17,9\}$$ (Equation 8)

TABLE 14

32-point DCT-8:

{a, b, c, d, e, f, g, h, i, j, k, l, m, n, o, p, q, r, s, t, u, v, w, x, y, z, A, B, C, D, E, F,}
{b, e, h, k, n, q, t, w, z, C, F, -E, -B, -y, -v, -s, -p, -m, -j, -g, -d, -a, -c, -f, -i, -l, -o, -r, -u, -x, -A, -D,}
{c, h, m, r, w, B, 0, -B, -w, -r, -m, -h, -c, -c, -h, -m, -r, -w, -B, 0, B, w, r, m, h, c, c, h, m, r, w, B,}
{d, k, r, y, F, -A, -t, -m, -f, -b, -i, -p, -w, -D, C, v, o, h, a, g, n, u, B, -E, -x, -q, -j, -c, -e, -l, -s, -z,}
{e, n, w, F, -y, -p, -g, -c, -l, -u, -D, A, r, i, a, j, s, B, -C, -t, -k, -b, -h, -q, -z, E, v, m, d, f, o, x,}
{f, q, B, -A, -p, -e, -g, -r, -C, z, o, d, h, s, D, -y, -n, -c, -i, -t, -E, x, m, b, j, u, F, -w, -l, -a, -k, -v,}
{g, t, 0, -t, -g, -g, -t, 0, t, g, g, t, 0, -t, -g, -g, -t, 0, t, g, g, t, 0, -t, -g, -g, -t, 0, t, g, g, t,}
{h, w, -B, -m, -c, -r, 0, r, c, m, B, -w, -h, -h, -w, B, m, c, r, 0, -r, -c, -m, -B, w, h, h, w, -B, -m, -c, -r,}
{i, z, -w, -f, -l, -C, t, c, o, F, -q, -a, -r, E, n, d, u, -B, -k, -g, -x, y, h, j, A, -v, -e, -m, -D, s, b, p,}
{j, C, -r, -b, -u, z, g, m, F, -o, -e, -x, w, d, p, -E, -l, -h, -A, t, a, s, -B, -i, -k, -D, q, c, v, -y, -f, -n,}
{k, F, -m, -i, -D, o, g, B, -q, -e, -z, s, c, x, -u, -a, -v, w, b, t, -y, -d, -r, A, f, p, -C, -h, -n, E, j, l,}
{l, -E, -h, -p, A, d, t, -w, -a, -x, s, e, B, -o, -i, -F, k, m, -D, -g, -q, z, c, u, -v, -b, -y, r, f, C, -n, -j,}
{m, -B, -c, -w, r, h, 0, -h, -r, w, c, B, -m, -tn, B, c, w, -r, -h, 0, h, r, -w, -c, -B, m, m, -B, -c, -w, r, h,}
{n, -y, -c, -D, i, s, -t, -h, E, d, x, -o, -ni z, b, C, -j, -r, u, g, -F, -e, -w, p, l, -A, -a, -B, k, q, -v, -f,}
{o, -v, -h, C, a, D, -g, -w, n, p, -u, -i, B, b, E, -f, -x, m, q, -t, -j, A, c, F, -e, -y, l, r, -s, -k, z, d,}
{p, -s, -m, v, j, -y, -g, B, d, -E, -a, -F, c, C, -f, -z, i, w, -l, -t, o, q, -r, -n, u, k, -x, -h, A, e, -D, -b,}
{q, -p, -r, o, s, -n, -t, m, u, -l, -v, k, w, -j, -x, i, y, -h, -z, g, A, -f, -B, e, C, -d, -D, c, E, -b, -F, a,}
{r, -m, -w, h, B, -c, 0, c, -B, -h, w, m, -r, -r, m, w, -h, -B, c, 0, -c, B, h, -w, -m, r, r, -m, -w, h, B, -c,}
{s, -j, -B, a, -C, -i, t, r, -k, -A, b, -D, -h, u, q, -l, -z, c, -E, -g, v, p, -m, -y, d, -F, -f, w, o, -n, -x, e,}
{t, -g, 0, g, -t, -t, g, 0, -g, t, t, -g, 0, g, -t, -t, g, 0, -g, t, t, -g, 0, g, -t, -t, g, 0, -g, t, t, -g,}
{u, -d, B, n, -k, -E, g, -r, -x, a, -y, -q, h, -F, -j, o, A, -c, v, t, -e, C, tn, -l, -D, f, -s, -w, b, -z, -p, i,}
{v, -a, w, u, -b, x, t, -c, y, s, -d, z, r, -e, A, q, -f, B, p, -g, C, o, -h, D, n, -i, E, m, -j, F, l, -k,}
{w, -c, r, B, -h, m, 0, -m, h, -B, -r, c, -w, -w, c, -r, -B, h, -m, 0, m, -h, B, r, -c, w, w, -c, r, B, -h, m,}
{x, -f, m, -E, -q, b, -t, -B, j, -i, A, u, -c, p, F, -n, e, -w, -y, g, -l, D, r, -a, s, C, -k, h, -z, -v, d, -o,}
{y, -i, h, -x, -z, j, -g, w, A, -k, f, -v, -B, l, -e, u, C, -m, d, -t, -D, n, -c, s, E, -o, b, -r, -F, p, -a, q,}
{z, -l, c, -q, E, u, -g, h, -v, -D, p, -b, m, -A, -y, k, -d, r, -F, -t, f, -i, w, C, -o, a, -n, B, x, -j, e, -s,}
{A, -o, c, -j, v, F, -t, h, -e, q, -C, -y, m, -a, l, -x, -D, r, -f, g, -s, E, w, -k, b, -e, z, B, -p, d, -i, u,}
{B, -r, h, -c, m, -w, 0, w, -m, c, -h, r, -B, -B, r, -h, c, -m, w, 0, -w, m, -c, h, -r, B, B, -r, h, -c, m, -w}
{C, -u, m, -e, d, -l, t, -B, -D, v, -n, f, -c, k, -s, A, E, -w, o, -g, b, -j, r, -z, -F, x, -p, h, -a, i, -q, y,}
{D, -x, r, -l, f, -a, g, -m, s, -y, E, C, -w, q, -k, e, -b, h, -n, t, -z, F, B, -v, p, -j, d, -c, i, -o, u, -A,}
{E, -A, w, -s, o, -k, g, -c, b, -f, j, -n, r, -v, z, -D, -F, B, -x, t, -p, l, -h, d, -a, e, -i, m, -q, u, -y, C,}
{F, -D, B, -z, x, -v, t, -r, p, -n, l, -j, h, -f, d, -b, a, -c, e, -g, i, -k, m, -o, q, -s, u, -w, y, -A, C, -E,} where $$\{a,b,c,d,e,f,g,h,i,j,k,l,m,n,o,p,q,r,s,t,u,v,w,x,y,z,A,B,C,D,E,F\} = \{90,90,89,88,88,86,85,84,82,80,78,77,74,72,68,66,63,60,56,53,50,45,42,38,34,30,26,21,17,13,9,4\}$$

(Equation 9)

In VVC, when both the height and width of the coding block is smaller than or equal to 64, the transform size is always the same as the coding block size. When either the height or width of the coding block is larger than 64, when doing the transform or intra prediction, the coding block is further split into multiple sub-blocks, where the width and height of each sub-block is smaller than or equal to 64, and one transform is performed on each sub-block.

In JVET-J0024, JVET-K0139 and JVET-L0358, a spatially varying transform scheme is proposed. With SVT, for inter prediction residuals, there is only residual block in the coding block, but the residual block is smaller than the coding block, therefore the transform size in SVT is smaller than the coding block size. For the region which is not covered by the residual block or transform, zero residual is assumed.

Figure 3:
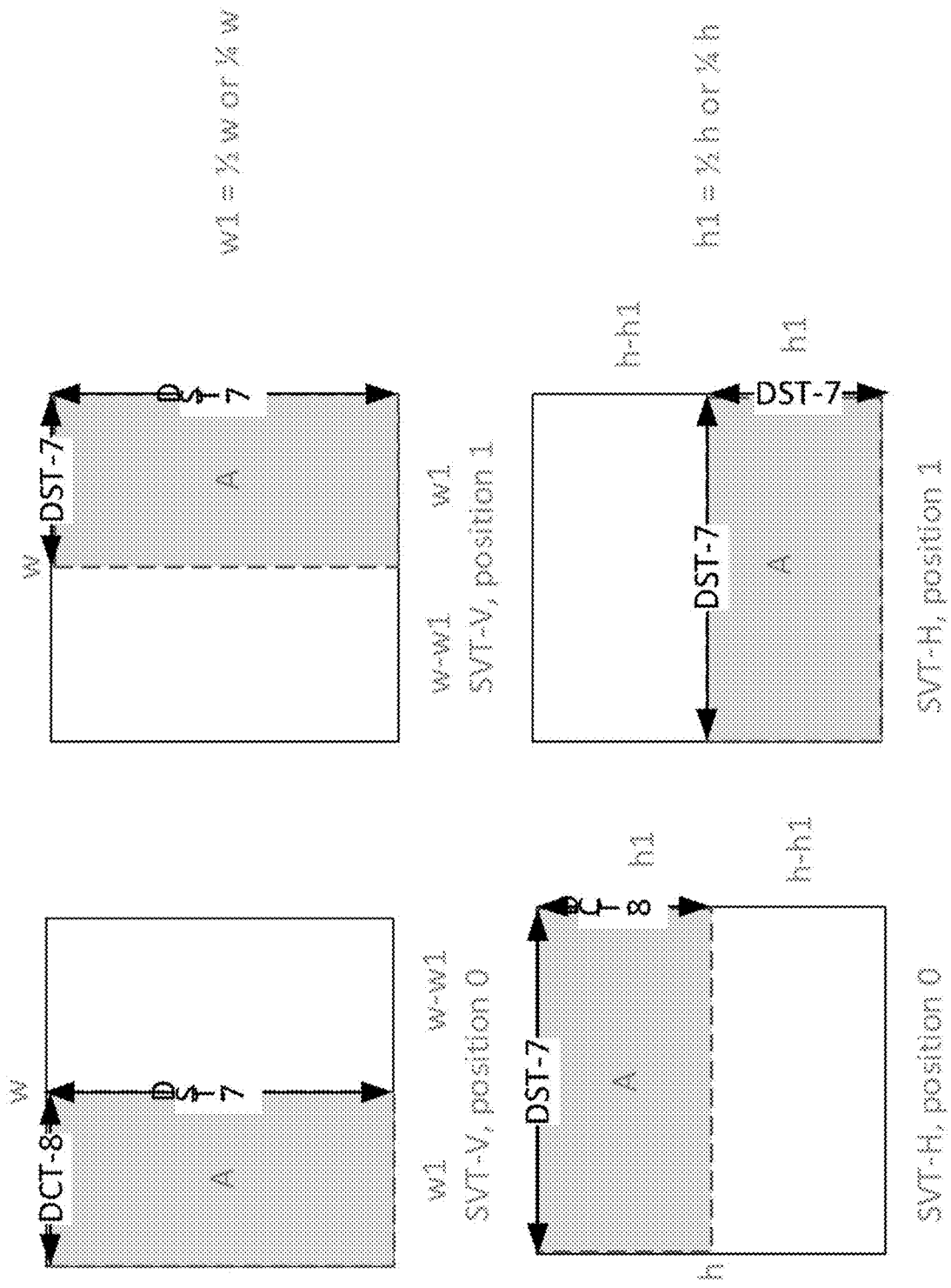
FIG. 3 illustrates examples of sub-block transform modes, according to an embodiment.

More specifically, in JVET-L0358, SVT is also called Sub-block Transform (SBT). The sub-block types (SVT-, SVT-H), sizes and positions (Left half, left quarter, right half, right quarter, top half, top quarter, bottom half, bottom quarter) supported in SBT are shown in FIG. 3. The shaded region labeled by letter "A" is a residual block with transform, and the other region is assumed to be zero residual without transform.

Proposed spec text changes by using the proposed SBT on top of VVC are shown below. It can be seen that the SBT methods requires additional overhead bits (cu_sbt_flag, cu_sbt_quad_flag, cu_sbt_horizontal_flag, cu_sbt_pos_flag) to be signaled to indicate the sub-block type (horizontal or vertical), size (half or quarter) and position (left or right, top or bottom).

TABLE 15

Sequence parameter set RBSP syntax

|  | Descriptor |
|---|---|
| seq_parameter_set_rbsp( ) { |  |
|    sps_seq_parameter_set_id | ue(v) |
|    ... |  |
|    sps_mts_intra_enabled_flag | u(1) |
|    sps_mts_inter_enabled_flag | u(1) |
|    sps_sbt_enable_flag | u(1) |
|    rbsp_trailing_bits( ) |  |
| } |  |

TABLE 16

General slice header syntax

|  | Descriptor |
|---|---|
| slice_header( ) { |  |
|    slice_pic_parameter_set_id | ue(v) |
|    slice_address | u(v) |
|    slice_type | ue(v) |
|    if ( slice_type != I ) { |  |
|       log2_diff_ctu_max_bt_size | ue(v) |
|       if( sps_sbtmvp_enabled_flag ) { |  |
|          sbtmvp_size_override_flag | u(1) |
|          if( sbtmvp_size_override_flag ) |  |
|             log2_sbtmvp_active_size_minus2 | u(3) |
|       } |  |
|       if( sps_temporal_mvp_enabled_flag) |  |
|          slice_temporal_mvp_enabled_flag | u(1) |
|       if( slice_type = = B ) |  |
|          mvd_l1_zero_flag | u(1) |
|       if( slice_temporal_mvp_enabled_flag ) { |  |
|          if( slice_type = = B ) |  |
|             collocated_from_l0_flag | u(1) |
|       } |  |
|       six_minus_max_num_merge_cand | ue(v) |
|       if( sps_sbt_enable_flag ) |  |
|          slice_max_sbt_size_64_flag | u(1) |
|    } |  |
|    if ( sps_alf_enabled_flag ) { |  |
|       slice_alf_enabled_flag | u(1) |
|       if( slice_alf_enabled_flag ) |  |
|          alf_data( ) |  |
|    } |  |
|    dep_quant_enabled_flag | u(1) |
|    if( !dep_quant_enabled_flag ) |  |
|       sign_data_hiding_enabled_flag | u(1) |
|    byte_alignment( ) |  |
| } |  |

TABLE 17

Coding unit syntax

|  | Descriptor |
|---|---|
| coding_unit( x0, y0, cbWidth, cbHeight, treeType ) { |  |
| ... |  |
|    if( CuPredMode[ x0 ][ y0 ] != MODE_INTRA && cu_skip_flag[ x0 ][ y0 ] = = 0 ) |  |
|       cu_cbf | ae(v) |
|    if( cu_cbf ) { |  |
|       if( CuPredMode[ x0 ][ y0 ] != MODE_INTRA && sps_sbt_enable_flag ) { |  |
|          if( cbWidth <= maxSbtSize && cbHeight <= maxSbtSize ) { |  |
|             allowSbtVerHalf = cbWidth >= 8 |  |
|             allowSbtVerQuad = cbWidth >= 16 |  |
|             allowSbtHorHalf = cbHeight >= 8 |  |
|             allowSbtHorQuad = cbHeight >= 16 |  |
|             if( allowSbtVerHalf \|\| allowSbtHorHalf \|\| allowSbtVerQuad \|\| allowSbtHorQuad ) |  |
|                cu_sbt_flag[ x0 ][ y0 ] | ae(v) |
|          } |  |
|          if( cu_sbt_flag[ x0 ][ y0 ] ) { |  |
|             if( ( allowSbtVerHalf \|\| allowSbtHorHalf ) && ( allowSbtVerQuad \|\| allowSbtHorQuad ) ) |  |
|                cu_sbt_quad_flag[ x0 ][ y0 ] | ae(v) |
|             if( ( cu_sbt_quad_flag[ x0 ][ y0 ] && allowSbtVerQuad && allowSbtHorQuad ) \|\| ( !cu_sbt_quad_flag[ x0 ][ y0 ] && allowSbtVerHalf && allowSbtHorHalf ) ) |  |
|                cu_sbt_horizontal_flag[ x0 ][ y0 ] | ae(v) |
|             cu_sbt_pos_flag[ x0 ][ y0 ] | ae(v) |
|          } |  |
|       } |  |
|       transform_tree( x0, y0, cbWidth, cbHeight, treeType ) |  |
|    } |  |
| } |  |

TABLE 18

Transform tree syntax

| | Descriptor |
|---|---|

```
transform_tree( x0, y0, tbWidth, tbHeight , treeType) {
    if( tbWidth > MaxTbSizeY | | tbHeight > MaxTbSizeY ) {
        trafoWidth = ( tbWidth > MaxTbSizeY ) ? (tbWidth / 2) : tbWidth
        trafoHeight = ( tbHeight > MaxTbSizeY ) ? (tbHeight / 2) : tbHeight
        transform_tree( x0, y0, trafoWidth, trafoHeight )
        if( tbWidth > MaxTbSizeY )
            transform_tree( x0 + trafoWidth, y0, trafoWidth, trafoHeight, treeType )
        if( tbHeight > MaxTbSizeY )
            transform_tree( x0, y0 + trafoHeight, trafoWidth, trafoHeight, treeType )
        if( tbWidth > MaxTbSizeY && tbHeight > MaxTbSizeY )
            transform_tree( x0 + trafoWidth, y0 + trafoHeight, trafoWidth, trafoHeight, treeType )
    } else if( cu_sbt_flag[ x0 ][ y0 ] )
        factorTb0 = cu_sbt_quad_flag[ x0 ][ y0 ] ? 1 : 2
        factorTb0 = cu_sbt_pos_flag[ x0 ][ y0 ] ? (4 − factorTb0 ) : factorTb0
        noResiTb0 = cu_sbt_pos_flag[ x0 ][ y0 ] ? 1 : 0
        if( !cu_sbt_horizontal_flag[ x0 ][ y0 ] ) {
            trafoWidth = tbWidth * factorTb0 / 4
            transform_tree( x0, y0, trafoWidth, tbHeight, treeType , noResiTb0 )
            transform_tree( x0 + trafoWidth, y0, tbWidth − trafoWidth, tbHeight, treeType, !noResiTb0)
        }
        else {
            trafoHeight = tbHeight * factorTb0 / 4
            transform_tree( x0, y0, tbWidth, trafoHeight, treeType , noResiTb0 )
            transform_tree( x0, y0 + trafoHeight, tbWidth, tbHeight − trafoHeight, treeType, !noResiTb0 )
        }
    } else {
        transform_unit( x0, y0, tbWidth, tbHeight, treeType , 0 )
    }
}
```

TABLE 19

Transform unit syntax

| | Descriptor |
|---|---|

```
transform_unit( x0, y0, tbWidth, tbHeight, treeType , noResi ) {
    if( ( treeType = = SINGLE_TREE | | treeType = = DUAL_TREE_LUMA ) &&
            !noResi )
        tu_cbf_luma[ x0 ][ y0 ]                                                    ae(v)
    if( ( treeType = = SINGLE_TREE | | treeType = = DUAL_TREE_CHROMA ) &&
            !noResi ) {
        tu_cbf_cb[ x0 ][ y0 ]                                                      ae(v)
        tu_cbf_cr[ x0 ][ y0 ]                                                      ae(v)
    }
    if(
( ( ( CuPredMode[ x0 ][ y0 ] == MODE_INTRA ) && sps_mts_intra_enabled_flag ) | |
( ( CuPredMode[ x0 ][ y0 ] = = MODE_INTER ) && sps_mts_inter_enabled_flag ) )
        && tu_cbf_luma[ x0 ][ y0 ] && treeType ! = DUAL_TREE_CHROMA
        && ( tbWidth <= 32 ) && ( tbHeight <= 32 ) && !cu_sbt_flag[ x0 ][ y0 ] )
        cu_mts_flag[ x0 ][ y0 ]                                                    ae(v)
    if( tu_cbf_luma[ x0 ][ y0 ] )
        residual_coding( x0, y0, log2( tbWidth ), log2( tbHeight ), 0 )
    if( tu_cbf_cb[ x0 ][ y0 ] )
        residual_coding( x0, y0, log2( tbWidth / 2 ), log2( tbHeight / 2 ), 1 )
    if( tu_cbf_cr[ x0 ][ y0 ] )
        residual_coding( x0, y0, log2( tbWidth / 2 ), log2( tbHeight / 2 ), 2 )
}
```

According to an example of sequence parameter set RBSP semantics, sps_sbt_enabled_flag equal to 0 specifies that sub-block transform for inter-predicted CU is disabled. sps_sbt_enabled_flag equal to 1 specifies that sub-block transform for inter-predicted CU is enabled.

According to an example of general slice header semantics, slice_sbt_max_size_64_flag equal to 0 specifies that the maximum CU width and height for allowing sub-block transform is 32. slice_sbt_max_size_64_flag equal to 1 specifies that the maximum CU width and height for allowing sub-block transform is 64. An example is shown below:

$$maxSbtSize = slice\_sbt\_max\_size\_64\_flag ? 64 : 32 \quad \text{(Equation 10)}$$

According to an example of coding unit semantics cu_sbt_flag[x0][y0] equal to 1 specifies that for the current coding unit, sub-block transform is used. cu_sbt_flag[x0][y0] equal to 0 specifies that for the current coding unit, the sub-block transform is not used. When cu_sbt_flag[x0][y0] is not present, its value is inferred to be equal to 0. When sub-block transform is used, a coding unit is tiled into two transform units, one transform unit has residual, the other does not have residual.

According to an embodiment, cu_sbt_quad_flag[x0][y0] equal to 1 specifies that for the current coding unit, the sub-block transform include a transform unit of ¼ size of the current coding unit. cu_sbt_quad_flag[x0][y0] equal to 0 specifies that for the current coding unit the sub-block transform include a transform unit of ½ size of the current coding unit. When cu_sbt_quad_flag[x0][y0] is not present, its value is inferred to be equal to 0.

According to an embodiment, cu_sbt_horizontal_flag[x0][y0] equal to 1 specifies that the current coding unit is tiled into 2 transform units by a horizontal split. cu_sbt_horizontal_flag[x0][y0] equal to 0 specifies that the current coding unit is tiled into 2 transform units by a vertical split.

According to an embodiment, when cu_sbt_horizontal_flag[x0][y0] is not present, its value is derived as follows:

- If cu_sbt_quad_flag[x0][y0] is equal to 1, cu_sbt_horizontal_flag[x0][y0] is set to be equal to allowSbtHoriQuad.
- Otherwise (cu_sbt_quad_flag[x0][y0] is equal to 0), cu_sbt_horizontal_flag[x0][y0] is set to be equal to allowSbtHoriHalf.

According to an embodiment, cu_sbt_pos_flag[x0][y0] equal to 1 specifies that the tu_cbf_luma, tu_cbf_cb and tu_cbf_cr of the first transform unit in the current coding unit are not present in the bitstream. cu_sbt_pos_flag[x0][y0] equal to 0 specifies that the tu_cbf_luma, tu_cbf_cb and tu_cbf_cr of the second transform unit in the current coding unit are not present in the bitstream.

An example of a transformation process for scaled transform coefficients is shown below. Inputs to this process are:
- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0..nTbW−1, y=0..nTbH−1.

Output of this process is the (nTbW)×(nTbH) array r[x][y] of residual samples with x=0..nTbW−1, y=0..nTbH−1.

If cu_sbt_flag[xTbY][yTbY] is equal to 1, the variable trTypeHor specifying the horizontal transform kernel and the variable trTypeVer specifying the vertical transform kernel are derived in Table 8 X depending on cu_sbt_horizontal_flag[xTbY][yTbY] and cu_sbt_pos_flag[xTbY][yTbY].

Otherwise (cu_sbt_flag[xTbY][yTbY] is equal to 0), the variable trTypeHor specifying the horizontal transform kernel and the variable trTypeVer specifying the vertical transform kernel are derived in Table 8 9 depending on mts_idx[xTbY][yTbY] and CuPredMode[xTbY][yTbY].

The (nTbW)×(nTbH) array r of residual samples is derived as follows:
1. Each (vertical) column of scaled transform coefficients d[x][y] with x=0..nTbW−1, y=0..nTbH−1 is transformed to e[x][y] with x=0..nTbW−1, y=0..nTbH−1 by invoking a one-dimensional transformation process for each column x=0..nTbW−1 with the height of the transform block nTbH, the list d[x][y] with y=0..nTbH−1 and the transform type variable trType set equal to trTypeVer as inputs, and the output is the list e[x][y] with y=0..nTbH−1.
2. The intermediate sample values g[x][y] with x=0..nTbW−1, y=0..nTbH−1 are derived as follows:

$$g[x][y] = Clip3(CoeffMin, CoeffMax, (e[x][y]+256) >> 9) \quad (0\text{-}1)$$

3. Each (horizontal) row of the resulting array g[x][y] with x=0..nTbW−1, y=0..nTbH−1 is transformed to r[x][y] with x=0..nTbW−1, y=0..nTbH−1 by invoking a one-dimensional transformation process for each row y=0..nTbH−1 with the width of the transform block nTbW, the list g[x][y] with x=0..nTbW−1 and the transform type variable trType set equal to trTypeHor as inputs, and the output is the list r[x][y] with x=0..nTbW−1.

TABLE 20

Specification of trTypeHor and trTypeVer depending on mts_idx[x][y] and CuPredMode[x][y]

| | cu_sbt_horizontal_flag [ xTbY ][ yTbY ] == 0 | | cu_sbt_horizontal_flag [ xTbY ][ yTbY ] == 1 | |
|---|---|---|---|---|
| | cu_sbt_pos_flag [ xTbY ][ yTbY ] == 0 | cu_sbt_pos_flag [ xTbY ][ yTbY ] == 1 | cu_sbt_pos_flag [ xTbY ][ yTbY ] == 0 | cu_sbt_pos_flag [ xTbY ][ yTbY ] == 1 |
| trTypeHor | 2 | 1 | nTbW > 32 ? 0:1 | nTbW > 32 ? 0:1 |
| trTypeVer | nTbH > 32 ? 0:1 | nTbH > 32 ? 0:1 | 2 | 1 |

TABLE 21

Specification of trTypeHor and trTypeVer depending on mts_idx[x][y] and CuPredMode[x][y]

| mts_idx[ xTbY ][ yTbY ] | CuPredMode[ xTbY ][ yTbY ] = = MODE_INTRA | | CuPredMode[ xTbY ][ xTbY ] = = MODE_INTER | |
|---|---|---|---|---|
| | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

FIG. 10 illustrates a simplified block diagram of a communication system (1000) according to an embodiment of the present disclosure. The communication system (1000) may include at least two terminals (1010-1020) interconnected via a network (1050). For unidirectional transmission of data, a first terminal (1010) may code video data at a local location for transmission to the other terminal (1020) via the network (1050). The second terminal (1020) may receive the coded video data of the other terminal from the network (1050), decode the coded data and display the recovered video data. Unidirectional data transmission may be common in media serving applications and the like.

FIG. 10 illustrates a second pair of terminals (1030, 1040) provided to support bidirectional transmission of coded video that may occur, for example, during videoconferencing. For bidirectional transmission of data, each terminal (1030, 1040) may code video data captured at a local location for transmission to the other terminal via the network (1050). Each terminal (1030, 1040) also may receive the coded video data transmitted by the other terminal, may decode the coded data and may display the recovered video data at a local display device.

In FIG. 10, the terminals (1010-1040) may be illustrated as servers, personal computers and smart phones but the principles of the present disclosure are not so limited. Embodiments of the present disclosure find application with laptop computers, tablet computers, media players and/or dedicated video conferencing equipment. The network (1050) represents any number of networks that convey coded video data among the terminals (1010-1040), including for example wireline and/or wireless communication networks. The communication network (1050) may exchange data in circuit-switched and/or packet-switched channels. Representative networks include telecommunications networks, local area networks, wide area networks and/or the Internet. For the purposes of the present discussion, the architecture and topology of the network (1050) may be immaterial to the operation of the present disclosure unless explained herein below.

Figure 11:
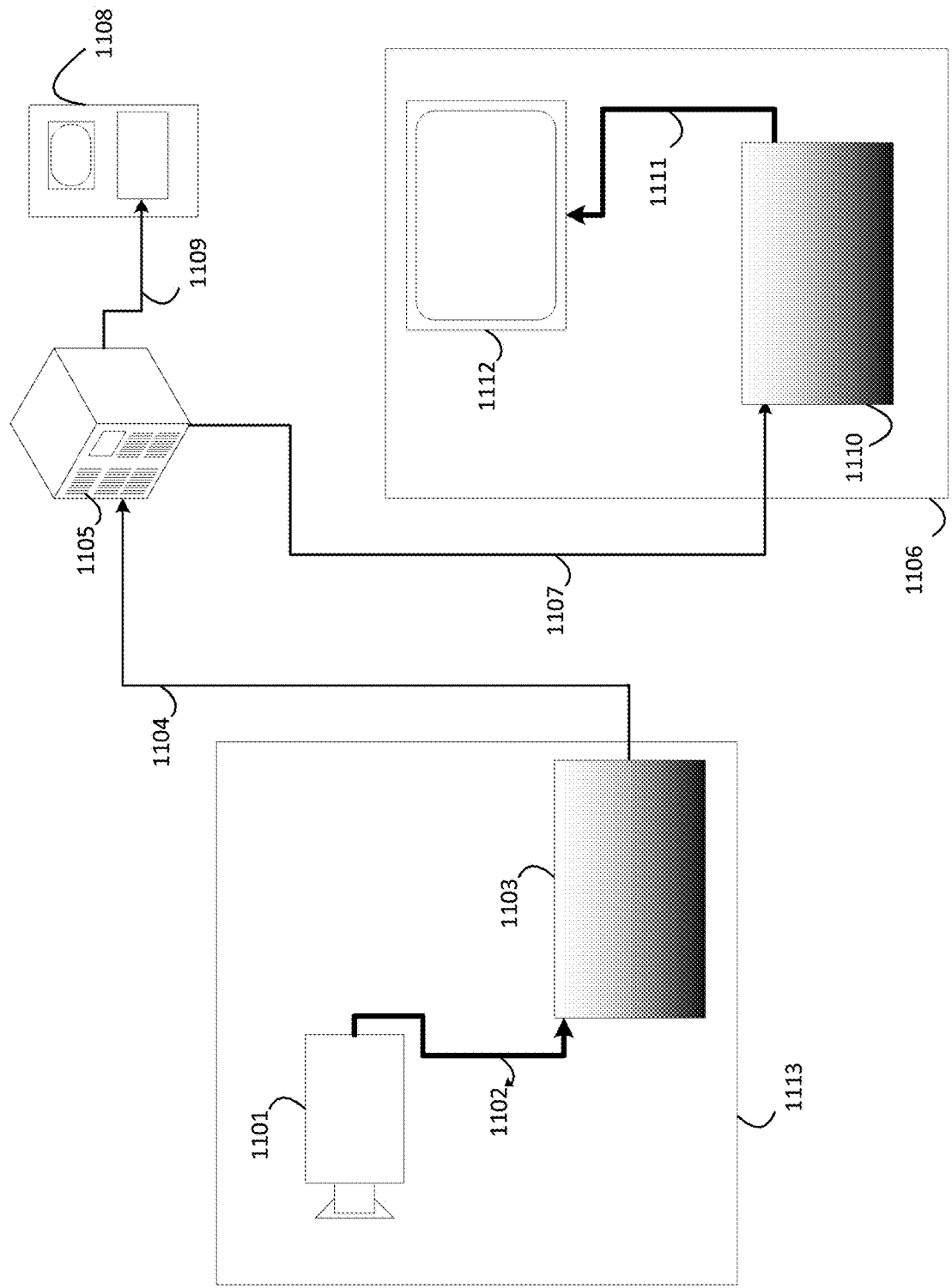
FIG. 11 is a diagram of the placement of a video encoder and decoder in a streaming environment.

FIG. 11 illustrates, as an example for an application for the disclosed subject matter, the placement of a video encoder and decoder in a streaming environment, for example streaming system 300. The disclosed subject matter can be equally applicable to other video enabled applications, including, for example, video conferencing, digital TV, storing of compressed video on digital media including CD, DVD, memory stick and the like, and so on.

A streaming system may include a capture subsystem (1113), that can include a video source (1101), for example a digital camera, creating, for example, an uncompressed video sample stream (1102). That sample stream (1102), depicted as a bold line to emphasize a high data volume when compared to encoded video bitstreams, can be processed by an encoder (1103) coupled to the camera 1101). The encoder (1103) can include hardware, software, or a combination thereof to enable or implement aspects of the disclosed subject matter as described in more detail below. The encoded video bitstream (1104), depicted as a thin line to emphasize the lower data volume when compared to the sample stream, can be stored on a streaming server (1105) for future use. One or more streaming clients (1106, 1108) can access the streaming server (1105) to retrieve copies (1107, 1109) of the encoded video bitstream (1104). A client (1106) can include a video decoder (1110) which decodes the incoming copy of the encoded video bitstream (1107) and creates an outgoing video sample stream (1111) that can be rendered on a display (1112) or other rendering device (not depicted). In some streaming systems, the video bitstreams (1104, 1107, 1109) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 12:
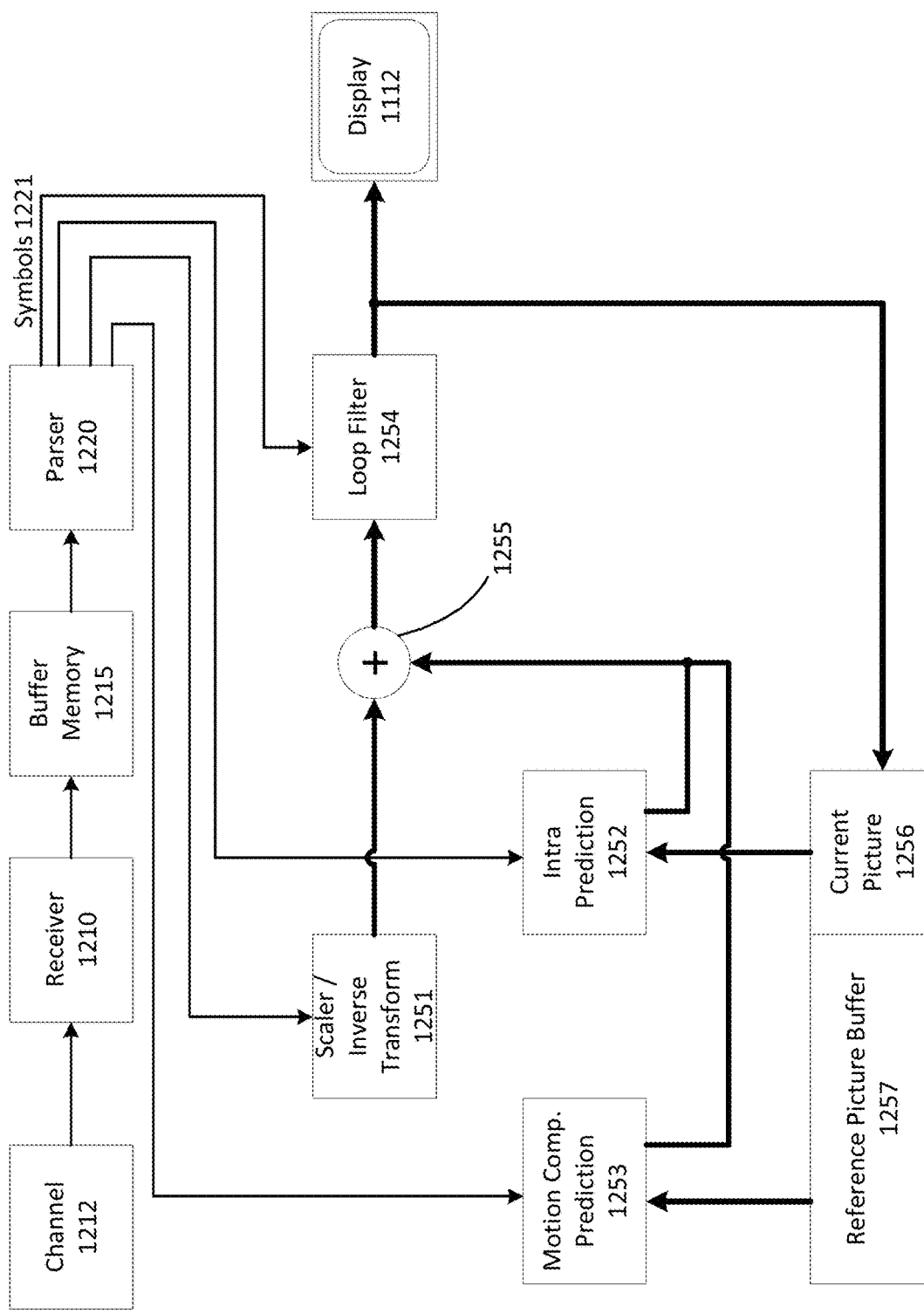
FIG. 12 is a functional block diagram of a video decoder according to an embodiment of the present disclosure.

FIG. 12 may be a functional block diagram of a video decoder (1110) according to an embodiment of the present invention.

A receiver (1210) may receive one or more codec video sequences to be decoded by the decoder (1110); in the same or another embodiment, one coded video sequence at a time, where the decoding of each coded video sequence is independent from other coded video sequences. The coded video sequence may be received from a channel (1212), which may be a hardware/software link to a storage device which stores the encoded video data. The receiver (1210) may receive the encoded video data with other data, for example, coded audio data and/or ancillary data streams, that may be forwarded to their respective using entities (not depicted). The receiver (1210) may separate the coded video sequence from the other data. To combat network jitter, a buffer memory (1215) may be coupled in between receiver (1210) and entropy decoder/parser (1220) ("parser" henceforth). When receiver (1210) is receiving data from a store/forward device of sufficient bandwidth and controllability, or from an isosychronous network, the buffer (1215) may not be needed, or can be small. For use on best effort packet networks such as the Internet, the buffer (1215) may be required, can be comparatively large and can advantageously of adaptive size.

The video decoder (1110) may include a parser (1220) to reconstruct symbols (1221) from the entropy coded video sequence. Categories of those symbols include information used to manage operation of the decoder (1110), and potentially information to control a rendering device such as a display (1112) that is not an integral part of the decoder but can be coupled to it, as was shown in FIG. 12. The control information for the rendering device(s) may be in the form of Supplementary Enhancement Information (SEI messages) or Video Usability Information (VUI) parameter set fragments (not depicted). The parser (1220) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (1220) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (1220) may perform entropy decoding/parsing operation on the video sequence received from the buffer (1215), so to create symbols (1221). The parser (1220) may receive encoded data, and selectively decode particular symbols (1221). Further, the parser (1220) may determine whether the particular symbols (1221) are to be provided to a Motion Compensation Prediction unit (1253), a scaler/inverse transform unit (1251), an Intra Prediction Unit (1252), or a loop filter (1256).

Reconstruction of the symbols (1221) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (1220). The flow of such subgroup control information between the parser (1220) and the multiple units below is not depicted for clarity.

Beyond the functional blocks already mentioned, decoder (1110) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (1251). The scaler/inverse transform unit (1251) receives quantized transform coefficient as well as control information, including which transform to use, block size, quantization factor, quantization scaling matrices, etc. as symbol(s) (1221) from the parser (1220). It can output blocks comprising sample values, that can be input into aggregator (1255).

In some cases, the output samples of the scaler/inverse transform (1251) can pertain to an intra coded block; that is: a block that is not using predictive information from previously reconstructed pictures, but can use predictive information from previously reconstructed parts of the current picture. Such predictive information can be provided by an intra picture prediction unit (1252). In some cases, the intra picture prediction unit (1252) generates a block of the same size and shape of the block under reconstruction, using surrounding already reconstructed information fetched from the current (partly reconstructed) picture (1258). The aggregator (1255), in some cases, adds, on a per sample basis, the prediction information the intra prediction unit (1252) has generated to the output sample information as provided by the scaler/inverse transform unit (1251).

In other cases, the output samples of the scaler/inverse transform unit (1251) can pertain to an inter coded, and potentially motion compensated block. In such a case, a Motion Compensation Prediction unit (1253) can access reference picture memory (1257) to fetch samples used for prediction. After motion compensating the fetched samples in accordance with the symbols (1221) pertaining to the block, these samples can be added by the aggregator (1255) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (1221) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (1255) can be subject to various loop filtering techniques in the loop filter unit (1256). Video compression technologies can include in-loop filter technologies that are controlled by parameters included in the coded video bitstream and made available to the loop filter unit (1256) as symbols (1221) from the parser (1220), but can also be responsive to meta-information obtained during the decoding of previous (in decoding order) parts of the coded picture or coded video sequence, as well as responsive to previously reconstructed and loop-filtered sample values.

The output of the loop filter unit (1256) can be a sample stream that can be output to the render device (1112) as well as stored in the reference picture memory (1258) for use in future inter-picture prediction.

Certain coded pictures, once fully reconstructed, can be used as reference pictures for future prediction. Once a coded picture is fully reconstructed and the coded picture has been identified as a reference picture (by, for example, parser (1220)), the current reference picture (1258) can become part of the reference picture buffer (1257), and a fresh current picture memory can be reallocated before commencing the reconstruction of the following coded picture.

The video decoder (1110) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (1210) may receive additional (redundant) data with the encoded video. The additional data may be included as part of the coded video sequence(s). The additional data may be used by the video decoder (1110) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 13:
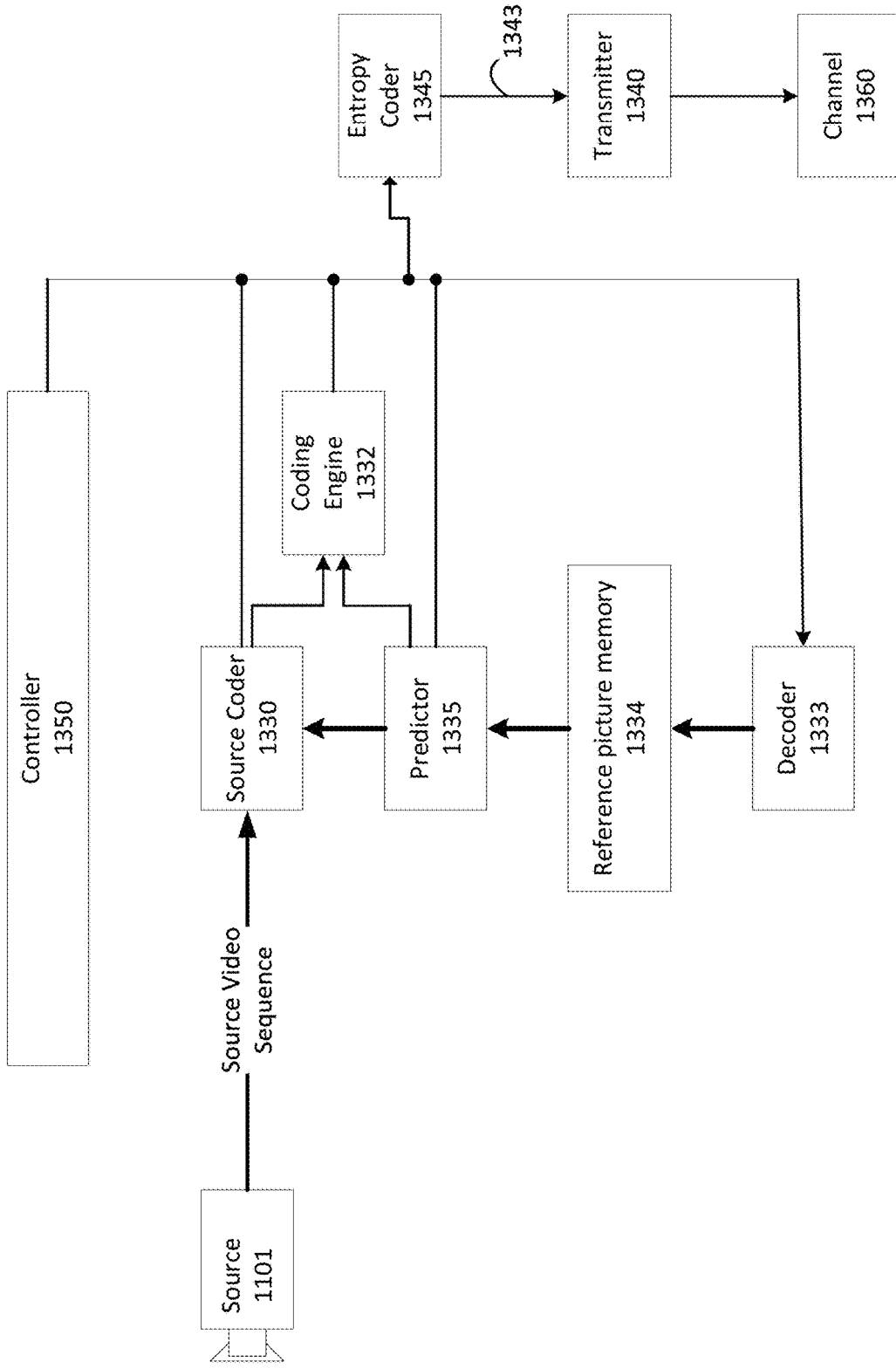
FIG. 13 is a functional block diagram of a video encoder according to an embodiment of the present disclosure.

FIG. 13 may be a functional block diagram of a video encoder (1103) according to an embodiment of the present disclosure.

The encoder (1103) may receive video samples from a video source (1101) (that is not part of the encoder) that may capture video image(s) to be coded by the encoder (1103).

The video source (1101) may provide the source video sequence to be coded by the encoder (1103) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (1101) may be a storage device storing previously prepared video. In a videoconferencing system, the video source (1103) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (1103) may code and compress the pictures of the source video sequence into a coded video sequence (1343) in real time or under any other time constraints as required by the application. Enforcing appropriate coding speed is one function of Controller (1350). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (1350) as they may pertain to video encoder (1103) optimized for a certain system design.

Some video encoders operate in what a person skilled in the art readily recognizes as a "coding loop." As an over-simplified description, a coding loop can consist of the encoding part of an encoder (1330) ("source coder" henceforth) (responsible for creating symbols based on an input picture to be coded, and a reference picture(s)), and a (local) decoder (1333) embedded in the encoder (1103) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (1334). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (1333) can be the same as of a "remote" decoder (1110), which has already been described in detail above in conjunction with FIG. 12. Briefly referring also to FIG. 13, however, as symbols are available and en/decoding of symbols to a coded video sequence by entropy coder (1345) and parser (1220) can be lossless, the entropy decoding parts of decoder (1110), including channel (1212), receiver (1210), buffer (1215), and parser (1220) may not be fully implemented in local decoder (1333).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (1330) may perform motion compensated predictive coding, which codes an input frame predictively with reference to one or more previously-coded frames from the video sequence that were designated as "reference frames." In this manner, the coding engine (1332) codes differences between pixel blocks of an input frame and pixel blocks of reference frame(s) that may be selected as prediction reference(s) to the input frame.

The local video decoder (1333) may decode coded video data of frames that may be designated as reference frames, based on symbols created by the source coder (1330). Operations of the coding engine (1332) may advantageously be lossy processes. When the coded video data may be decoded at a video decoder (not shown in FIG. 13), the reconstructed video sequence typically may be a replica of the source video sequence with some errors. The local video decoder (1333) replicates decoding processes that may be performed by the video decoder on reference frames and may cause reconstructed reference frames to be stored in the reference picture cache (1334). In this manner, the encoder (1103) may store copies of reconstructed reference frames locally that have common content as the reconstructed reference frames that will be obtained by a far-end video decoder (absent transmission errors).

The predictor (1335) may perform prediction searches for the coding engine (1332). That is, for a new frame to be coded, the predictor (1335) may search the reference picture memory (1334) for sample data (as candidate reference pixel blocks) or certain metadata such as reference picture motion vectors, block shapes, and so on, that may serve as an appropriate prediction reference for the new pictures. The predictor (1335) may operate on a sample block-by-pixel block basis to find appropriate prediction references. In some cases, as determined by search results obtained by the predictor (1335), an input picture may have prediction references drawn from multiple reference pictures stored in the reference picture memory (1334).

The controller (1350) may manage coding operations of the video coder (1330), including, for example, setting of parameters and subgroup parameters used for encoding the video data.

Output of all aforementioned functional units may be subjected to entropy coding in the entropy coder (1345). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (1340) may buffer the coded video sequence(s) as created by the entropy coder (1345) to prepare it for transmission via a communication channel (1360), which may be a hardware/software link to a storage device which would store the encoded video data. The transmitter (1340) may merge coded video data from the video coder (1330) with other data to be transmitted, for example, coded audio data and/or ancillary data streams (sources not shown).

The controller (1350) may manage operation of the encoder (1103). During coding, the controller (1350) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (1103) may perform coding operations according to a predetermined video coding technology or standard, such as ITU-T Rec. H.265. In its operation, the video coder (1103) may perform various compression operations, including predictive coding operations that exploit temporal and spatial redundancies in the input video sequence. The coded video data, therefore, may conform to a syntax specified by the video coding technology or standard being used.

In an embodiment, the transmitter (1340) may transmit additional data with the encoded video. The video coder (1330) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In VVC, except for CU with width or height larger than 64, CU size is always equal to TU size, which is less flexible than the RQT design in HEVC and may be improved for better coding performance.

A straightforward utilization of RQT on top of VVC may be not optimal, because recursive transform split brings high complexity and there are non-square coding blocks in VVC which may not prefer quad-tree split.

SVT requires several overhead bits to indicate the sub-block transform type, position and size, which is expensive especially for inter coding. If such signaling can be avoided, and a method used to implicitly derive the sub-block transform type, position and size, it may be more efficient in terms of coding gain and encoder complexity.

One limitation of SVT is that, it can only support very limited sub-block position, e.g., left or right, top or bottom, while adding more supporting position inevitably adds the encoder complexity and signaling cost. If the sub-block position can be implicitly derived, the supported sub-block position may be more flexible without adding encoder or decoder complexity.

Embodiments of the disclosure may be used separately or combined in any order. Throughout the disclosure, DST-7 may be replaced by DST-4, and DCT-8 may be replaced by DCT-4.

According to an embodiment, a block shape adaptive transform split may be applied. In this embodiment, the number of sub-block transform and the size of sub-block transform are dependent on the coding block (CU) size.

Figure 4B:
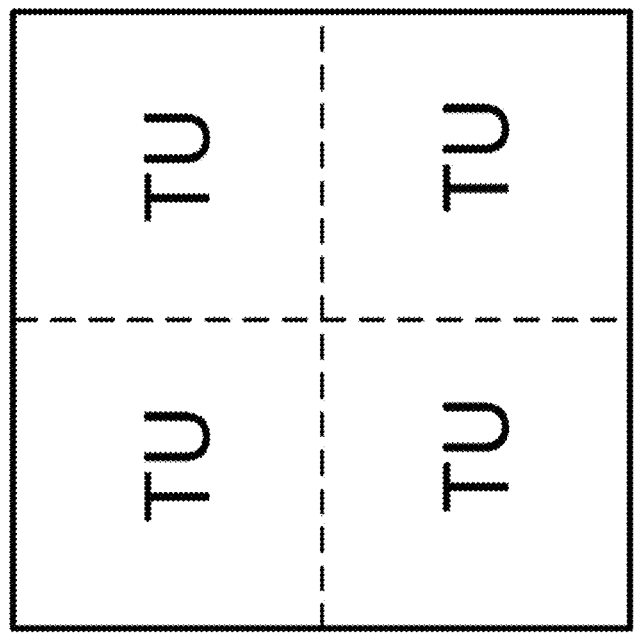
FIGS. 4A and 4B illustrate examples of sub-block partitioning for a square block, according to an embodiment.
Figure 4A:
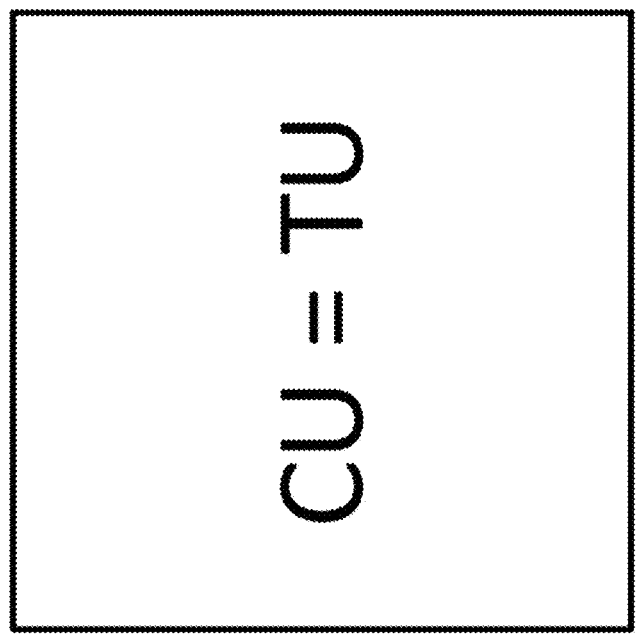

In one embodiment, if the coding block is a square block, the coding block may either employ one single transform as shown in FIG. 4A, or four quarter size transforms, as shown in FIG. 4B. The selection may be signaled by a flag.

Figure 5D:
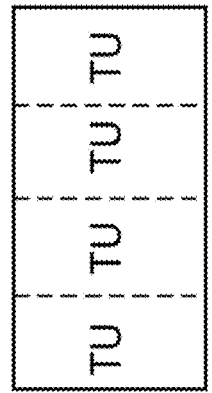
FIGS. 5A-5E illustrate examples of sub-block partitioning for a rectangular block, according to an embodiment.
Figure 5E:
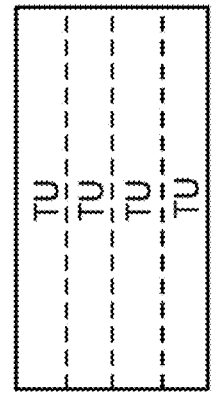
Figure 5A:
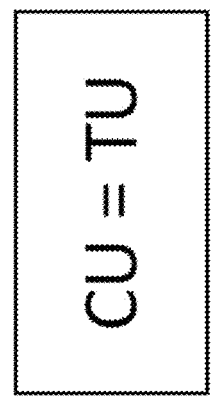

In another embodiment, if the coding block width is larger than height, the coding block may either employ one single transform as shown in FIG. 5A, or multiple equal smaller size transforms. The selection may be signaled by a flag.

Figure 5B:
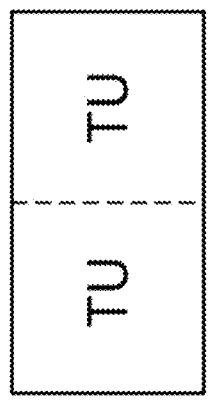

In one example, the coding block is split into 2 half size sub-blocks as shown in FIG. 5B, and transform is performed on each sub-block, and each of the half size transform has half width of the coding block, but same height of the coding block.

Figure 5C:
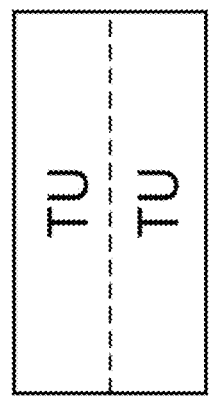

In one example, the coding block is split into 2 half size sub-blocks as shown in FIG. 5C, and transform is performed on each sub-block, and each of the half size transform has half height of the coding block, but same width of the coding block.

In one example, the coding block is split into 4 quarter size sub-blocks as shown in FIG. 5D, and transform is performed on each sub-block, and each of the quarter size transform has quarter width of the coding block, but same height of the coding block.

In one example, the coding block is split into 4 quarter size sub-blocks as shown in FIG. 5E, and transform is performed on each sub-block, and each of the quarter size transform has quarter height of the coding block, but same width of the coding block.

Figure 6A:
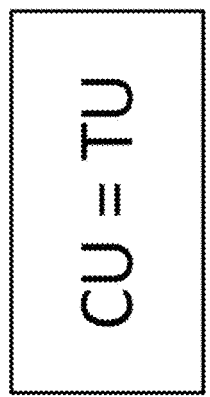
FIGS. 6A-6C illustrate examples of sub-block partitioning for a rectangular block, according to an embodiment.

In another embodiment, if the coding block width is larger than height, the coding block may either apply one single transform as shown in FIG. 6A, or three sub-block transforms. The selection may be signaled by a flag.

Figure 6B:
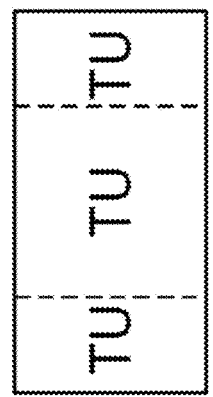

In one example shown in FIG. 6B, each of the half size transform has half width of the coding block, but same height of the coding block.

Figure 6C:
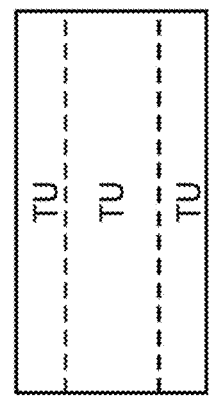

In one example shown in FIG. 6C, each of the half size transform has half height of the coding block, but same width of the coding block.

Figure 7C:
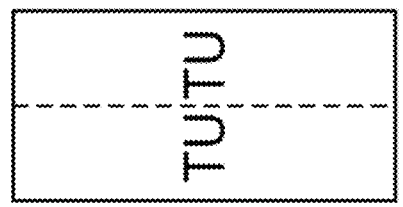
FIGS. 7A-7C illustrate examples of sub-block partitioning for a rectangular block, according to an embodiment.
Figure 7B:
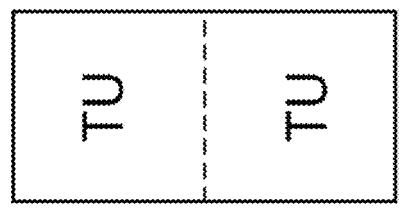
Figure 7A:
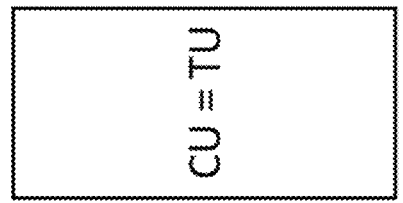

In another embodiment, if the coding block height is larger than width, the coding block may either apply one single transform as shown in FIG. 7A, or multiple equal smaller size. The selection may be signaled by a flag.

In one example shown in FIG. 7B, the coding block is split into 2 half size sub-blocks, and transform is performed on each sub-block, and each of the half size transform has half height of the coding block, but same width of the coding block.

In one example shown in FIG. 7C, the coding block is split into 2 half size sub-blocks, and transform is performed on each sub-block, each of the half size transform has half width of the coding block, but same height of the coding block.

In one example, the coding block is split into 4 quarter size sub-blocks, and transform is performed on each sub-block, and each of the quarter size transform has quarter height of the coding block, but same width of the coding block.

In one example, the coding block is split into 4 quarter size sub-blocks, and transform is performed on each sub-block, and each of the quarter size transform has quarter width of the coding block, but same height of the coding block.

Figure 8C:
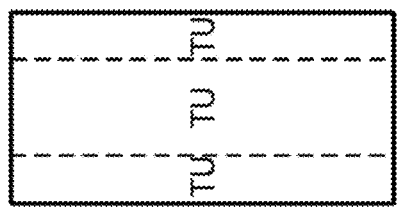
FIGS. 8A-8C illustrate examples of sub-block partitioning for a rectangular block, according to an embodiment.
Figure 8B:
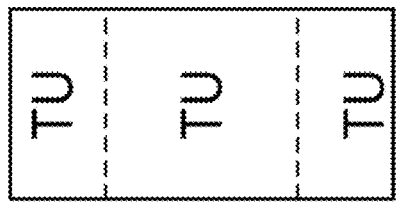
Figure 8A:
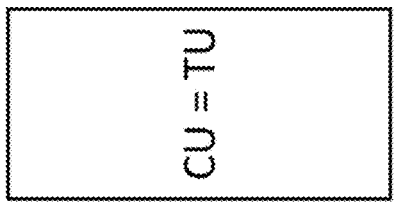

In another embodiment, if the coding block height is larger than width, the coding block may either apply one single transform as shown in FIG. 8A, or three sub-block transforms. The selection may be signaled by a flag.

In one example shown in FIG. 8B, each of the sub-block transforms has same width of the coding block.

In one example shown in FIG. 8C, each of the sub-block transform has same height of the coding block.

For each TU, depending on the location of TU inside the CU, different transform sets may be applied for MTS.

In one embodiment, for each TU, depending on the location of TU inside the CU, different order of available transform types in one transform set may be applied for MTS.

Figure 9A:
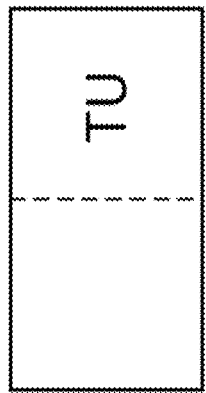
FIGS. 9A-9D illustrate examples of the application of different transform sets, according to an embodiment.
Figure 9B:
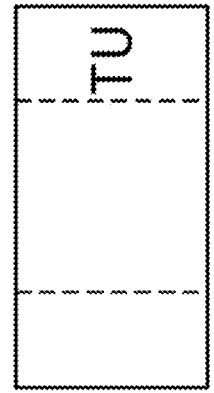

In one example, if the TU is in the left half of CU as shown in FIGS. 9A and 9B, the order of transform types in the transform set for horizontal transform selection in MTS is {DCT-8, DST-7}, alternatively, the order of transform set is {DST-7, DCT-8}.

Figure 9C:
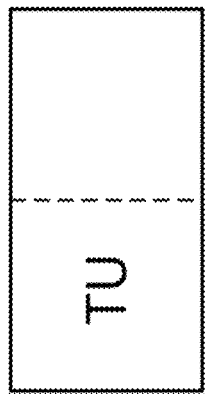
Figure 9D:
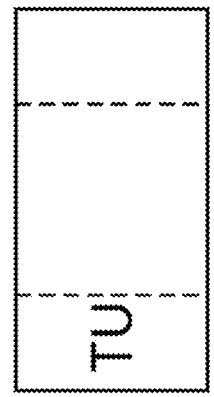

In one example, if the TU is in the right half of CU as shown in FIGS. 9C and 9D, the order of transform types in the transform set for horizontal transform selection in MTS is {DST-7, DCT-8}, alternatively, the order of transform set is {DCT-8, DST-7}.

In one example, if the TU is in the top half of CU, the order of transform types in the transform set for vertical transform selection in MTS is {DCT-8, DST-7}, alternatively, the order of transform types in the transform set is {DST-7, DCT-8}.

In one example, if the TU is in the bottom half of CU, the order of transform types in the transform set for vertical transform selection in MTS is {DST-7, DCT-8}, alternatively, the order of transform types in the transform set is {DCT-8, DST-7}.

In one example, if the left boundary of TU is aligned with the left boundary of CU, and the right boundary of TU is also aligned with the right boundary of CU, then the order of transform types in the transform set for horizontal transform selection in MTS is {DCT-8, DST-7}, alternatively, the order of transform types in the transform set is {DST-7, DCT-8}.

In one example, if the top boundary of TU is aligned with the top boundary of CU, and the bottom boundary of TU is also with the bottom boundary of CU (For example, the figures shown for 1.c.i), then the order of transform types in the transform set for vertical transform selection in MTS is {DCT-8, DST-7}, alternatively, the order of transform types in the transform set is {DST-7, DCT-8}.

In one example, if the left boundary of TU is not aligned with the left boundary of CU, and the right boundary of TU is not aligned with the right boundary of CU either, then the order of transform types in the transform set for horizontal transform selection in MTS is {DCT-8, DST-7}, alternatively, the order of transform types in the transform set is {DST-7, DCT-8}.

In one example, if the top boundary of TU is not aligned with the top boundary of CU, and the bottom boundary of TU is aligned with the bottom boundary of CU not, then the order of transform types in the transform set for vertical transform selection in MTS is {DCT-8, DST-7}, alternatively, the order of transform types in the transform set is {DST-7, DCT-8}.

In one embodiment, for each TU, depending on the location of TU inside the CU, different number of available transform types in one transform set may be applied for MTS.

In one example, if the TU is in the left half or right half of CU, the transform set for horizontal transform has two transform types, DST-7 or DCT-8, alternatively, the transform set has only one default transform DCT-2 (or DST-7, or DCT-8).

In one example, if the TU is in the top half or bottom half of CU, the transform set for vertical transform has two transform types, DST-7 or DCT-8, alternatively, the transform set has only one default transform DCT-2 (or DST-7, or DCT-8).

In another embodiment, the methods above are only applied to inter CU, but not applied on intra CU.

According to an embodiment, a transform split may be limited to only one level, meaning that for each coding block, after splitting coding block into multiple smaller TUs, each TU cannot be further split. Therefore, TU split is not recursive.

For the coding block, a cbf_flag_cb_depth0 flag and a cbf_flag_cr_depth0 flag may be signaled to indicate whether there is any nonzero cb and cr coefficient in the whole coding block, respectively.

If the coding block is further split into multiple TUs, then for each TU, a cbf_flag_cb_depth1 flag may be signaled if cbf_flag_cb_depth0 is signaled with a default value which indicates there is at least one nonzero coefficient in the whole coding block.

If the coding block is further split into multiple TUs, then for each TU, a cbf_flag_cr_depth1 flag may be signaled if cbf_flag_cr_depth0 is signaled with a default value which indicates there is at least one nonzero coefficient in the whole block.

If the coding block is further split into multiple TUs, for the last coded TU, a cbf_flag_cb_depth1 (or cbf_flag_cr_depth1) flag is not signaled but implicitly derived if cbf_flag_cb_depth0 (or cbf_flag_cr_depth0) may be signaled with a default value which indicates at least one nonzero cb (or cr) coefficient and the cbf_flag_cb_depth1 (cbf_flag_cr_depth1) flag of all preceding TUs inside the same coding block are coded with a default value (e.g., 0) which indicates no nonzero coefficient.

The implicitly derived cbf_flag_cb_depth1 (or cbf_flag_cr_depth1) flag value may be a value indicating there is at least one nonzero coefficient.

For the coding block, a cbf_flag_chroma_depth0 flag may be signaled to indicate whether there is any nonzero chroma coefficient in the whole coding block.

If the coding block is further split into multiple TUs, then for each TU, a cbf_flag_chroma_depth1 flag may be signaled if cbf_flag_chroma_depth0 is signaled with a default value which indicates at least one nonzero coefficient.

For each TU, if a cbf_flag_chroma_depth1 flag is signaled with a default value (e.g., 1) which indicates at least one nonzero chroma coefficient, then a cbf_flag_cb_depth1 flag and a cbf_flag_cr_depth1 flag may be further signaled to indicate whether there is at least one nonzero cb and cr coefficient, respectively.

For each TU, if a cbf_flag_chroma_depth1 flag is signaled with a default value (e.g., 1) which indicates at least one nonzero chroma coefficient, and a cbf_flag_cb_depth1 flag is further signaled with a default value (e.g., 0) which indicates no nonzero cb coefficient, then the cbf_flag_cr_depth1 flag may be not signaled but implicitly derived as the value which indicates at least one nonzero cr coefficient.

If the coding block is further split into multiple TUs, for the last coded TU, a cbf_flag_chroma_depth1 flag may be not signaled but implicitly derived if cbf_flag_chroma_depth0 is signaled with a default value which indicates at least one nonzero coefficient and the cbf_flag_chroma_depth1 flag of all preceding TUs inside the same coding block are coded with a default value (e.g., 0) which indicates no nonzero coefficient.

The implicitly derived cbf_flag_chroma_depth1 (or cbf_flag_chroma_depth1) flag value may be a value indicating there is at least one nonzero coefficient.

A root_cbf may be coded for the coding block to indicate whether there is any nonzero luma or chroma coefficient inside the whole coding block.

If the coding block is further split into multiple TUs, for the last coded TU, a cbf_flag_luma_depth1 flag may be not signaled but implicitly derived if all preceding TUs inside the same coding block are coded with a default value (e.g., 0) which indicates no nonzero luma or chroma coefficient and the current TU has no nonzero chroma coefficient.

The implicitly derived cbf_flag_luma_depth1 flag value is a value indicating there is at least one nonzero luma coefficient.

In the present disclosure, the sub-block covering most of the energy of residual block, may mean that a measurement of samples covered by this sub-block is larger than a given percentage of a measurement of samples covered by the whole coding block. The percentage can be pre-defined threshold values, e.g., 90% or 80%. The measurement includes, but is not limited to: sum of absolute value, or sum of squared value.

For inter coding, when multiple prediction blocks are used to generate the prediction of current block, e.g., bi-prediction, or inter-intra prediction, the prediction sample values of these prediction blocks may be used to determine the transform size and/or position of current block.

In one embodiment, a virtual residual block (VRB) is calculated by subtracting one prediction block from the other, then according to the residual energy distribution of this VRB, a transform block size and position is determined for the current block.

In one embodiment, the sub-block transform size can be only half size, and the sub-block position which covers most of the energy of the residual block is determined as the sub-block transform position.

In another embodiment, the sub-block transform size can be only quarter size, e.g., quarter in width, or quarter in height, or half in both width and height, and the sub-block position which covers most of the energy of the residual block is determined as the sub-block transform position.

In another embodiment, the sub-block transform size can be either half size or quarter size, and the size selection is explicitly signaled for the current block, then given the selected sub-block transform size, the sub-block block position which covers most of the energy of the residual block is determined as the sub-block transform position.

In another embodiment, both the sub-block transform size and position are determined by trying different sub-block size and positions on this VRB, when a particular sub-block transform size and position covers most of the residual energy, it is determined as the sub-block transform size and position.

Different residual percentage threshold values may be used for different sub-block size. For example, the residual percentage threshold for half size sub-block transform size is K0, and the residual percentage threshold for quarter size sub-block transform size is K1, then K1 is larger than K0.

In an embodiment, the optimal sub-block transform position is determined individually for each candidate sub-block transform size, then the candidate sub-block transform size which gives least residual energy value per sample is selected as the sub-block transform size.

In another embodiment, only a subset of sub-block positions is allowed. For example, the offsets to the top-left of the current block in both x and y directions must be multiples of a value. The value may be predefined or signaled in bitstream, such as in SPS, PPS, slice header, or tile header. For samples which are not covered by the sub-block transform, it may be assumed to be zero, so no coefficient is signaled.

For inter coding, when only one prediction block is used to generate the prediction of current block (e.g., uni-prediction), a second virtual prediction block may be located, and the prediction block and this second virtual prediction block may be used to determine the transform size and/or position of current block.

In one embodiment, the second virtual prediction block is derived by mirroring the motion vector of current block and locate the reference block in a different reference picture.

In one embodiment, the second virtual prediction block is derived by searching for a neighboring block which uses a different reference frame of current block, then the second virtual prediction block is derived by using the position of current block, the motion vector of this neighboring block and the associated reference frame.

In another embodiment, the second virtual prediction block is derived by intra planar mode.

In another embodiment, with the prediction block and the second virtual prediction block, a virtual residual block (VRB) may be calculated by subtracting one prediction block from the other, then according to the residual energy distribution of this VRB, a transform block size and position may be determined for the current block. Then the techniques described above may be applied.

For inter coding, whether a full-size transform size or a smaller transform size is used can be signaled using a flag for each coding block.

In one embodiment, if the resulting sub-block transform size is not supported, e.g., 2-point transform need to be used, then this sub-block size can never be used.

In one embodiment, if the current block has different motion vectors for different samples, e.g., sub-block motion, then the sub-block size cannot be used so that sub-block transform cannot be used.

In one embodiment, if the current block has different motion vectors for different samples, e.g., sub-block motion, then virtual residual block is also divided as multiple sub virtual residual blocks, and the residual samples are derived for each sub prediction block separately using their associated motion vector and prediction block.

The sub-block transform size and position may be derived by luma samples but shared for chroma samples. In an embodiment, the sub-block transform size and position may be derived by both luma and chroma samples and used for both current luma and chroma block. In an embodiment, the sub-block transform size and position may be only derived and used for luma samples.

When both luma and chroma samples are used for deriving the virtual residual block, the residual energy for each sample may be then measured by the weighted sum of residual energy of both luma and chroma samples. The weighting may be predefined or signaled in bitstream, such as in SPS, PPS, slice header or tile header.

Whether the above techniques can be applied, is signaled in high-level syntax elements, including, but not limited to VPS, PPS, SPS, Slice, Tile, Tile group, CTU header.

Figure 14:
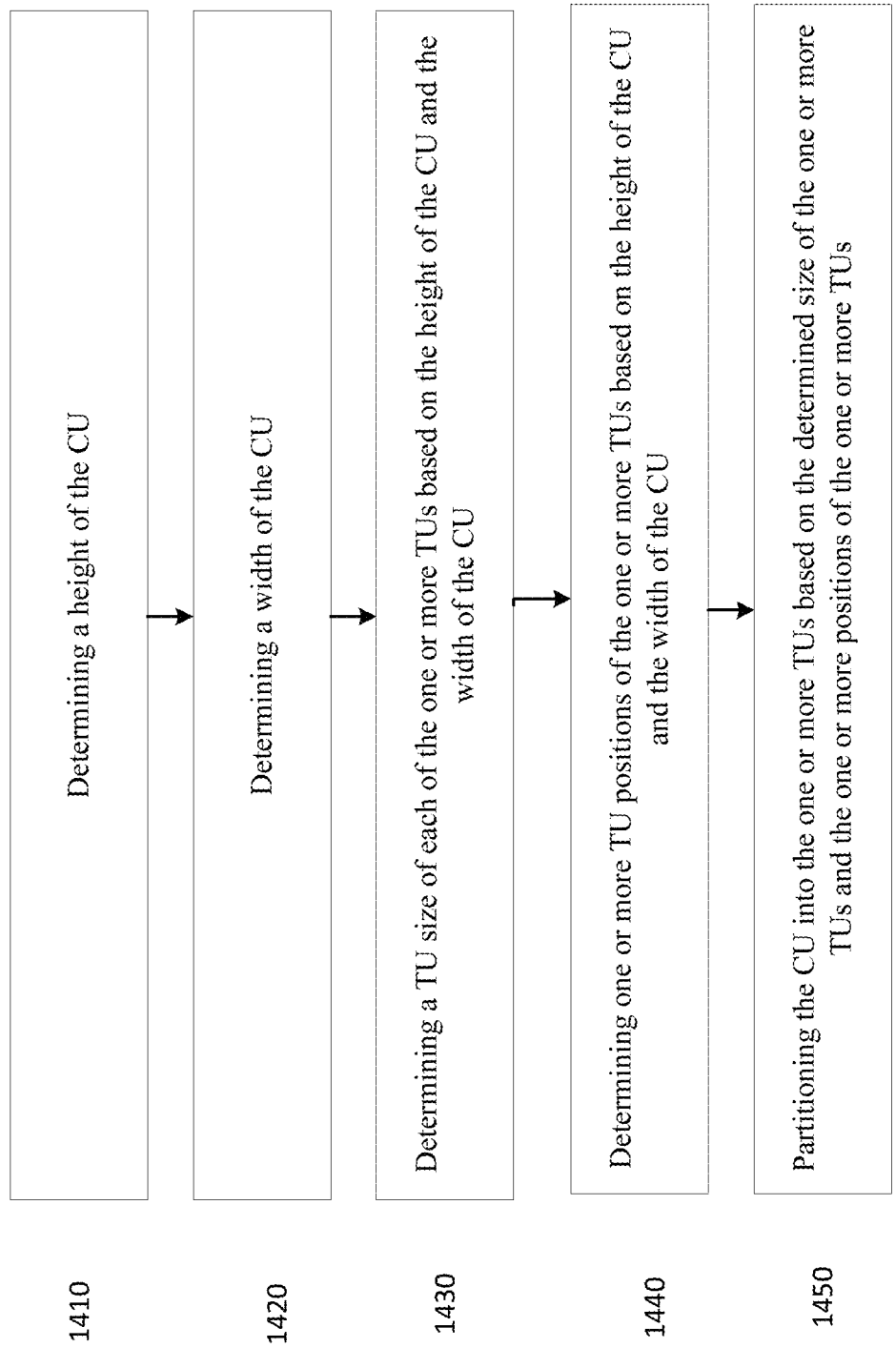
FIG. 14 is a flowchart of an example process for selecting a reference sample used to encode a current block in an encoded video bitstream, according to an embodiment of the present disclosure.

FIG. 14 is a flowchart is a flowchart of an example process ~H00 for partitioning a coding unit (CU) into one or more transform units (TUs) for encoding a video sequence. In some implementations, one or more process blocks of FIG. 14 may be performed by decoder 1110. In some implementations, one or more process blocks of FIG. 14 may be performed by another device or a group of devices separate from or including decoder 1110, such as encoder 1103.

As shown in FIG. 14, process 1400 may include determining a height of the CU (block 1410).

As further shown in FIG. 14, process 1400 may include determining a width of the CU (block 1420).

As further shown in FIG. 14, process 1400 may include determining a TU size of each of the one or more TUs based on the height of the CU and the width of the CU (block 1430).

As further shown in FIG. 14, process 1400 may include determining one or more TU positions of the one or more TUs based on the height of the CU and the width of the CU (block 1440).

As further shown in FIG. 14, process 1400 may include partitioning the CU into the one or more TUs based on the determined size of the one or more TUs and the one or more positions of the one or more TUs (block 1450).

According to an embodiment, the height of the CU may be equal to the width of the CU, a number of the one or more TUs may be four, a height of the each of the one or more TUs may be half of the height of the CU, and a width of the each of the one or more TUs may be half of the width of the CU.

According to an embodiment, the width of the CU may be greater than the height of the CU, a number of the one or more TUs may be two, a height of each of the one or more TUs may be equal to the height of the CU, and a width of the each of the one or more TUs may be half of the width of the CU.

According to an embodiment, the height of the CU may be greater than the width of the CU, a number of the one or more TUs may be two, a height of each of the one or more TUs may be half of the height of the CU, and a width of the each of the one or more TUs may be equal to the width of the CU.

According to an embodiment, an order of transform types available to a TU of the one or more TUs may be determined based on a position of the TU from among the one or more TU positions.

According to an embodiment, the one or more TUs are not partitioned into smaller TUs.

According to an embodiment, the process 1400 may further include determining that multiple prediction blocks are used to perform inter prediction coding of the CU; and determining at least one from among the TU size and the one or more TU positions based on prediction sample values of the multiple prediction blocks.

According to an embodiment, the multiple prediction blocks may include a first prediction block and a second prediction block, and the process 1400 may further include calculating a virtual residual block (VRB) by subtracting the second prediction block from the first prediction block; and determining the at least one from among the TU size and the one or more TU positions based on a residual energy distribution of the VRB.

According to an embodiment, the one or more TU positions may be selected from a subset of potential TU positions.

According to an embodiment, the subset may be signaled in one from among a sequence parameter set, a picture parameter set, a slice header, or a tile header.

According to an embodiment, the process 1400 may further include determining that a single prediction block is used to perform inter prediction coding of the CU; locating a virtual prediction block; and determining at least one from among the TU size and the one or more TU positions based on the prediction block and the virtual prediction block.

According to an embodiment, the virtual prediction block may be derived by mirroring a motion vector of the CU and locating the virtual prediction block in a reference picture which is different from a reference picture of the prediction block.

According to an embodiment, the CU may be associated with a first reference frame, and the process 1400 may further include determining a neighboring block associated with a second reference frame which is different from the first reference frame, and deriving the virtual prediction block based on a position of the CU, a motion vector of the neighboring block, and the second reference frame.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media.

For example, FIG. 15 shows a computer system 1500 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 15 for computer system 1500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1500.

Computer system 1500 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1501, mouse 1502, trackpad 1503, touch screen 1510, data-glove 1204, joystick 1505, microphone 1506, scanner 1507, camera 1508.

Computer system 1500 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1510, data-glove 1204, or joystick 1505, but there can also be tactile feedback devices that do not serve as input devices), audio output devices (such as: speakers 1509, headphones (not depicted)), visual output devices (such as screens 1510 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1500 can also include human accessible storage devices and their associated media such as optical media including CD/DVD ROM/RW 1520 with CD/DVD or the like media 1521, thumb-drive 1522, removable hard drive or solid state drive 1523, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include interface to one or more communication networks (1555). Networks (1555) can for example be wireless, wireline, optical. Networks (1555) can further be local, wide-area, metropolitan, vehicular and industrial, real-time, delay-tolerant, and so on. Examples of networks (1555) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks (1555) commonly require external network interface adapters (1554) that attached to certain general purpose data ports or peripheral buses (1549) (such as, for example USB ports of the computer system (1500); others are commonly integrated into the core of the computer system (1500) by attachment to a system bus as described below (for example Ethernet interface into a PC computer system or cellular network interface into a smartphone computer system). Using any of these networks (1555), computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (1555) and network interfaces (1554) as described above.

Aforementioned human interface devices, human-accessible storage devices, and network interfaces can be attached to a core 1540 of the computer system 1500.

The core 1540 can include one or more Central Processing Units (CPU) 1541, Graphics Processing Units (GPU) 1542, specialized programmable processing units in the form of Field Programmable Gate Areas (FPGA) 1543, hardware accelerators for certain tasks 1544, and so forth. These devices, along with Read-only memory (ROM) 1545, Random-access memory (RAM) 1546, internal mass storage such as internal non-user accessible hard drives, solid-state drives (SSDs), and the like 1547, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1549. Architectures for a peripheral bus include peripheral component interconnect (PCI), USB, and the like.

CPUs 1541, GPUs 1542, FPGAs 1543, and accelerators 1544 can execute certain instructions that, in combination, can make up the aforementioned computer code. That computer code can be stored in ROM 1545 or RAM 1546. Transitional data can be also be stored in RAM 1546, whereas permanent data can be stored for example, in the internal mass storage 1547. Fast storage and retrieve to any of the memory devices can be enabled through the use of cache memory, that can be closely associated with one or more CPU 1541, GPU 1542, mass storage 1547, ROM 1545, RAM 1546, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1500, and specifically the core 1540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1540 that are of non-transitory nature, such as core-internal mass storage 1547 or ROM 1545. The software implementing various embodiments of the present disclosure can be stored in such devices and executed by core 1540. A computer-readable medium can include one or more memory devices or chips, according to particular needs. The software can cause the core 1540 and specifically the processors therein (including CPU, GPU, FPGA, and the like) to execute particular processes or particular parts of particular processes described herein, including defining data structures stored in RAM 1546 and modifying such data structures according to the processes defined by the software. In addition or as an alternative, the computer system can provide functionality as a result of logic hardwired or otherwise embodied in a circuit (for example: accelerator 1544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Acronyms

HEVC: High Efficiency Video Coding
HDR: high dynamic range
SDR: standard dynamic range
VVC: Versatile Video Coding
JVET: Joint Video Exploration Team
CU: Coding Unit
PU: Prediction Unit
MTS: Multiple Transform Selection
EMT: Enhanced Multiple Transform
AMT: Adaptive Multiple Transform
SVT: Spatially Varying Transform
SBT: Sub-block Transform
VPS: Video Parameter Set
PPS: Picture Parameter Set
SPS: Sequence Parameter Set

The invention claimed is:

1. A method of partitioning a coding unit (CU) into one or more transform units (TUs) for encoding a video sequence using at least one processor, the method comprising:
   determining a height of the CU;
   determining a width of the CU;
   determining at least one from among a virtual residual block (VRB) corresponding to the CU and a virtual prediction block corresponding to the CU;
   determining a number of the one or more TUs based on at least the height of the CU and the width of the CU;
   determining a TU size of each of the one or more TUs based on the height of the CU, the width of the CU, and the at least one from among the VRB and the virtual prediction block;
   partitioning the CU into the one or more TUs based on the determined TU size.

2. The method of claim 1, wherein the height of the CU is equal to the width of the CU,
   wherein the number of the one or more TUs is four,
   wherein a height of the each of the one or more TUs is half of the height of the CU, and
   wherein a width of the each of the one or more TUs is half of the width of the CU.

3. The method of claim 1, wherein the width of the CU is greater than the height of the CU,
   wherein the number of the one or more TUs is two,
   wherein a height of each of the one or more TUs is equal to the height of the CU, and
   wherein a width of the each of the one or more TUs is half of the width of the CU.

4. The method of claim 1, wherein the height of the CU is greater than the width of the CU,
   wherein the number of the one or more TUs is two,
   wherein a height of each of the one or more TUs is half of the height of the CU, and
   wherein a width of the each of the one or more TUs is equal to the width of the CU.

5. The method of claim 1, wherein an order of transform types available to a TU of the one or more TUs is determined based on a position of the TU.

6. The method of claim 1, wherein the one or more TUs are not partitioned into smaller TUs.

7. The method of claim 1, further comprising:
   determining that multiple prediction blocks are used to perform inter prediction coding of the CU; and
   determining the TU size based on prediction sample values of the multiple prediction blocks.

8. The method of claim 7, wherein the multiple prediction blocks comprise a first prediction block and a second prediction block, and
   wherein the method further comprises:
   calculating the VRB by subtracting the second prediction block from the first prediction block; and
   determining the TU size based on a residual energy distribution of the VRB.

9. The method of claim 7, further comprising determining one or more TU positions of the one or more TUs based on the height of the CU, the width of the CU, and the at least one from among the VRB and the virtual prediction block,
   wherein the one or more TU positions are selected from a subset of potential TU positions.

10. The method of claim 9, wherein the subset is signaled in one from among a sequence parameter set, a picture parameter set, a slice header, or a tile header.

11. The method of claim 1, further comprising:
   determining that a single prediction block is used to perform inter prediction coding of the CU;
   locating the virtual prediction block; and
   determining the TU size based on the prediction block and the virtual prediction block.

12. The method of claim 11, wherein the virtual prediction block is derived by mirroring a motion vector of the CU and locating the virtual prediction block in a reference picture which is different from a reference picture of the prediction block.

13. The method of claim 11, wherein the CU is associated with a first reference frame, and
   wherein the method further comprises:
      determining a neighboring block associated with a second reference frame which is different from the first reference frame; and
      deriving the virtual prediction block based on a position of the CU, a motion vector of the neighboring block, and the second reference frame.

14. A device for partitioning a coding unit (CU) into one or more transform units (TUs) for encoding a video sequence, the device comprising:
   at least one memory configured to store program code; and
   at least one processor configured to read the program code and operate as instructed by the program code, the program code including:
      first determining code configured to cause the at least one processor to determine a height of the CU;
      second determining code configured to cause the at least one processor to determine a width of the CU;
      third determining code configured to cause the at least one processor to determine at least one from among a virtual residual block (VRB) corresponding to the CU and a virtual prediction block corresponding to the CU;
      fourth determining code configured to cause the at least one processor to determine a number of the one or more TUs based on at least the height of the CU and the width of the CU;
      fifth determining code configured to cause the at least one processor to determine a TU size of each of the one or more TUs based on the height of the CU, the width of the CU, and the at least one from among the VRB and the virtual prediction block;
      partitioning code configured to cause the at least one processor to partition the CU into the one or more TUs based on the determined TU size.

15. The device of claim 14, wherein an order of transform types available to a TU of the one or more TUs is determined based on a position of the TU.

16. The device of claim 14, wherein the one or more TUs are not partitioned into smaller TUs.

17. The device of claim 14, wherein the program code further comprises:
   sixth determining code configured to cause the at least one processor to determine that multiple prediction blocks are used to perform inter prediction coding of the CU;
   seventh determining code configured to cause the at least one processor to determine the TU size based on prediction sample values of the multiple prediction blocks.

18. The device of claim 17, wherein the multiple prediction blocks comprise a first prediction block and a second prediction block, and
   wherein the program code further comprises:
      calculating code configured to cause the at least one processor to calculate the VRB by subtracting the second prediction block from the first prediction block; and
      eighth determining code configured to cause the at least one processor to determine the TU size based on a residual energy distribution of the VRB.

19. The device of claim 14, wherein the program code further comprises:
   sixth determining code configured to cause the at least one processor to determine that a single prediction block is used to perform inter prediction coding of the CU;
   locating code configured to cause the at least one processor to locate the virtual prediction block; and
   seventh determining code configured to cause the at least one processor to determine the TU size based on the prediction block and the virtual prediction block.

20. A non-transitory computer-readable medium storing instructions, the instructions comprising: one or more instructions that, when executed by one or more processors of a device for partitioning a coding unit (CU) into one or more transform units (TUs) for encoding a video sequence, cause the one or more processors to:
   determine a height of the CU;
   determining a width of the CU;
   determine at least one from among a virtual residual block (VRB) corresponding to the CU and a virtual prediction block corresponding to the CU;
   determining a number of the one or more TUs based on at least the height of the CU and the width of the CU;
   determine a TU size of each of the one or more TUs based on the height of the CU, the width of the CU, and the at least one from among the VRB and the virtual prediction block;
   partition the CU into the one or more TUs based on the determined TU size.

* * * * *